(12) United States Patent
Emori et al.

(10) Patent No.: US 7,058,465 B2
(45) Date of Patent: Jun. 6, 2006

(54) METHOD OF PREPARING ESTIMATE FOR SHEET METAL WORKING

(75) Inventors: Ryuharu Emori, Isehara (JP); Toshio Takagi, Isehara (JP); Koichi Tsuchida, Isehara (JP)

(73) Assignee: Amada Company, Limited, Kanagawa (JP)

( * ) Notice: Subject to any disclaimer, the term of this patent is extended or adjusted under 35 U.S.C. 154(b) by 13 days.

(21) Appl. No.: 10/450,525

(22) PCT Filed: Dec. 25, 2001

(86) PCT No.: PCT/JP01/11351

§ 371 (c)(1),
(2), (4) Date: Aug. 7, 2003

(87) PCT Pub. No.: WO02/054295

PCT Pub. Date: Jul. 11, 2002

(65) Prior Publication Data

US 2004/0073469 A1 Apr. 15, 2004

(30) Foreign Application Priority Data

Dec. 28, 2000 (JP) .............................. 2000-402721

(51) Int. Cl.
*G06F 19/00* (2006.01)
(52) U.S. Cl. ................... 700/97; 700/100; 700/104; 700/105; 700/106; 700/107; 700/162; 700/182; 705/29; 705/400
(58) Field of Classification Search ............ 700/96–98, 700/104–107, 122, 181, 182, 162, 100; 705/7–8, 705/400, 29
See application file for complete search history.

(56) References Cited

U.S. PATENT DOCUMENTS 5,552,995 A * 9/1996 Sebastian .................... 700/97

(Continued)

FOREIGN PATENT DOCUMENTS

JP 4-3250 1/1992

(Continued)

OTHER PUBLICATIONS

English Language Abstract of JP 5-282331.

(Continued)

*Primary Examiner*—Anthony Knight
*Assistant Examiner*—Ronald D Hartman, Jr.
(74) *Attorney, Agent, or Firm*—Greenblum & Bernstein, P.L.C.

(57) ABSTRACT

A method is provided for preparing an estimate for sheet metal working. Data of bending lines and data of an associated processing time for the bending lines is stored. Data of holes and data of an associated processing time for the holes is stored. A three-dimensional view and a development drawing which realizes the three-dimensional view are prepared based on an orthographic drawing. A bending line and a hole on a product are detected based on at least one of data of the three-dimensional view and data of the development drawing. A processing time of the specified bending line is calculated based on the associated data of the bending lines. A processing time of the specified hole on the product is calculated based on the associated data of the holes. The processing time of the bending line and the processing time of the hole are stored in a processing time memory. A total processing time necessary to process the product is calculated by adding up the processing times stored in the processing time memory. The total processing time is converted to a cost of processing the product in consideration of a cost per processing time.

11 Claims, 23 Drawing Sheets

U.S. PATENT DOCUMENTS

| | | | | |
|---|---|---|---|---|
| 5,969,973 | A * | 10/1999 | Bourne et al. | 700/165 |
| 6,233,538 | B1 * | 5/2001 | Gupta et al. | 703/6 |
| 6,490,498 | B1 * | 12/2002 | Takagi | 700/159 |
| 6,560,499 | B1 * | 5/2003 | Demmer | 700/97 |
| 6,879,872 | B1 * | 4/2005 | Fukumura | 700/165 |
| 2002/0065790 | A1 * | 5/2002 | Oouchi | 705/400 |
| 2002/0165744 | A1 * | 11/2002 | Juras et al. | 705/7 |
| 2003/0037014 | A1 * | 2/2003 | Shimizu et al. | 705/400 |
| 2004/0019402 | A1 * | 1/2004 | Bourne et al. | 700/165 |
| 2004/0148046 | A1 * | 7/2004 | Fukumura | 700/97 |
| 2005/0038537 | A1 * | 2/2005 | Okada et al. | 700/97 |

FOREIGN PATENT DOCUMENTS

| | | |
|---|---|---|
| JP | 5-282331 | 10/1993 |
| JP | 7-21286 | 1/1995 |
| JP | 11110451 | 4/1999 |

OTHER PUBLICATIONS

English Language Abstract of JP 7-21286.

English Language Abstract of JP 4-3250.

English Language Abstract of JP 11-110451.

\* cited by examiner

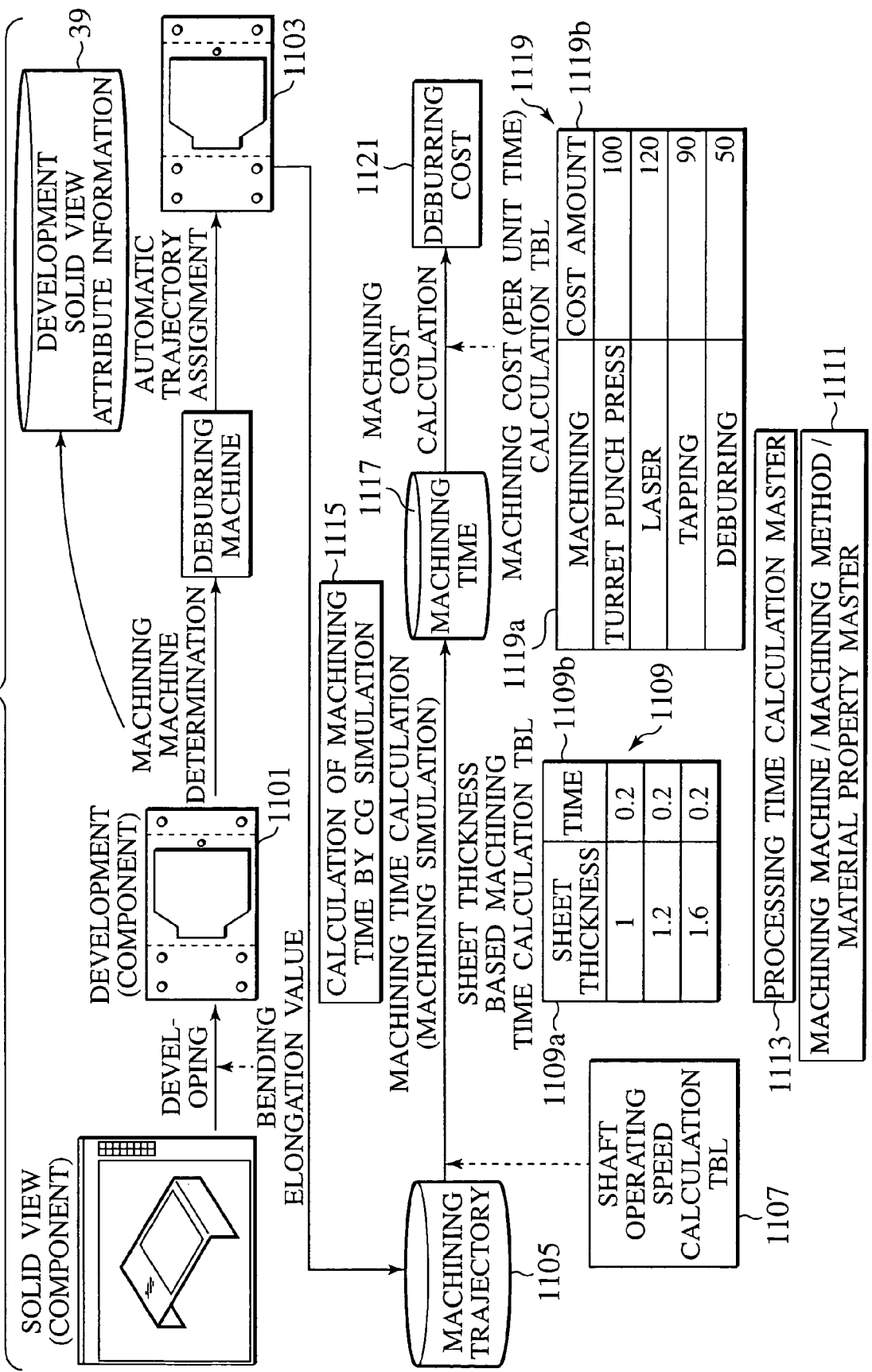

FIG.12

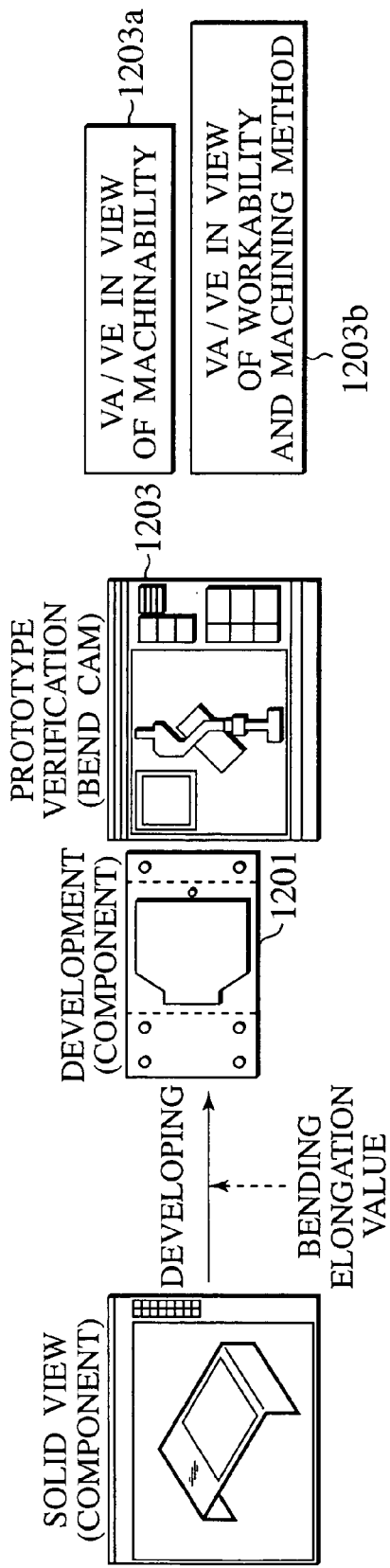

- SOLID VIEW (COMPONENT)
- DEVELOPING
- BENDING ELONGATION VALUE
- DEVELOPMENT (COMPONENT) — 1201
- PROTOTYPE VERIFICATION (BEND CAM) — 1203
  - VA/VE IN VIEW OF MACHINABILITY — 1203a
  - VA/VE IN VIEW OF WORKABILITY AND MACHINING METHOD — 1203b

[BENDING COST]
- STANDARD UNIT COST TABLE VARIES DEPENDING ON MATERIAL AND SHEET THICKNESS.
- $\Sigma \begin{pmatrix} \text{BENDING SHAPE} \\ \text{BASED MACHINING TIME} \end{pmatrix} \times \begin{pmatrix} \text{BENDING STANDARD UNIT COST} \\ \text{(PER UNIT TIME)} \end{pmatrix}$ — 1213a, 1213b
- BENDING SET-UP COST = NUMBER OF USED DIES × DIE EXCHANGE TIME — 1215a, 1215b
- SPECIAL DIE PURCHASE COST (WHEN SPECIAL DIE IS REQUIRED)

BENDING COST (1205) = NUMBER OF MACHINED WORKPIECES (1207) × [BENDING COST + BENDING SET-UP COST (1209) + SPECIAL DIE PURCHASE COST (1211)]

FIG.19

| | ESTIMATE | | | |
|---|---|---|---|---|
| 1901 | ESTIMATE NUMBER | D980627-00001A001 | | BAR-CODE |
| 1903 | CUSTOMER | AMDM | | |
| 1905 | ORDER NUMBER | 980609-001 | | ORDER CLASS |

1907

| | | | | |
|---|---|---|---|---|
| 1911 | PRODUCT NAME | (PARENT) MACHINING COVER | | MANAGEMENT |
| 1913 | PRODUCT NUMBER | MCN-COVER | | STANDARD |
| 1915 | DRAWING NUMBER | MCN-COVER-00 | | BAR-CODE |
| 1917 | PARENT INFORMATION | | | |

| | | | | |
|---|---|---|---|---|
| 1919 | IN-HOUSE DELIVERY DATE | 1998/6/27 | 1931 | MACHINING NOTE 1 |
| 1921 | SPECIFIED BOX | NUMBER 0 BLOCK 0 RAW 0 COLUMN | 1933 | MACHINING NOTE 2 |
| 1923 | NUMBER OF ORDERED PRODUCTS | 10 | 1935 | CHANGE HISTORY 1 |
| | | | 1937 | CHANGE HISTORY 2 |
| 1925 | NUMBER OF STOCKS | 0 | 1939 | PRODUCT INFORMATION 1 |
| 1927 | MANUFACTURING NUMBER | 10/10 | 1941 | PRODUCT INFORMATION 2 |
| | | | 1943 | DELIVERY SLIP NOTE |
| 1929 | NEW / REPEAT | NEW | 1945 | DELIVERY NOTE |

FIG.20

| 2001 | 2003 | 2005 | 2007 |
|---|---|---|---|
| PROCESS NAME | No | MACHINING DUE DATE | WORKER | PROCESS DETAIL |
| IN-HOUSE INSPECTION | 1 | | | |
| PROCESSING | 2 | | | |

- 2011 — MATERIAL MEMO
- 2013 — SHEET THICKNESS / ROW MATERIAL DIMENSION  T=
- 2015 — COMPONENT DIMENSION  X=  Y=
- 2017 — NUMBER OF TAKEN PIECES: 0 | CONSTITUENT NUMBER: 1
- 2021 — BENDING INFORMATION 1
- 2023 — BENDING INFORMATION 2
- 2025 — MEMO FIELD

2009 — RELATED IMAGE DATA

METHOD OF PREPARING ESTIMATE FOR SHEET METAL WORKING

TECHNICAL FIELD

The present invention relates to a method of preparing an estimate for sheet metal working and, more specifically, to a method of preparing an estimate for sheet metal working, which simulates manufacturing of a product and makes an estimate when an order for manufacturing of the product is received.

BACKGROUND ART

Generally, for example, a manufacturer which manufactures sheet metal products receives a paper orthographic drawing of a product and is asked to provide an estimate by a purchaser.

The purchaser selects and decides a manufacturer which provides a proper price, a delivery date, quality or the like of the product, for example, based on the estimate.

Regarding the manufacturer asked for the estimate, a skilled person creates a solid view of the product in a mind from the paper ortho graphic drawing. Then, the skilled person develops the solid view to estimate and provide a machining time, a machining cost, machineability, a delivery date of the product, and the like.

Meanwhile, when a design is changed for reasons of the purchaser that has asked for manufacturing of the product, the manufacturer prepares an estimate again and also examines a delivery date of the product from the beginning.

This conventional method of preparing an estimate has problems as follows, for example.

Specifically, there is a problem that, in preparation of an estimate, it takes a long time to create a solid view of a product from an orthographic drawing in the mind and develop the solid view.

Moreover, since the solid view and a development are created in the mind, there is a problem that an error might occur and the estimate must be provided again.

Since a delivery date for manufacturing of the product is determined directly based on the orthographic drawing on paper, there is a problem that man-hours or the like of machining machines are not known and the delivery date can not be accurately calculated.

If a design is changed, for example, there is a problem that the delivery date may be considerably delayed.

DISCLOSURE OF THE INVENTION

The present invention is made in the light of the problems as described above. The present invention is a method of preparing an estimate for sheet metalworking, the method preferably including a step of storing data of bending lines and data of processing time for the bending lines in association with each other; a step of storing data of holes and data of processing time for the holes in association with each other, a step of preparing a three-dimensional view and a development which realizes the three-dimensional view based on an orthographic drawing by use of a computer, a step of detecting a bending line and a hole formed on a product based on data of the three-dimensional view or data of the development, a step of calculating by use of the computer a processing time of the specified bending line based on a predetermined equation with reference to the associated data, a step of calculating a processing time of the specified hole formed on the product based on a predetermined equation with reference to the associated data, a step of storing the processing time of the bending line and the processing time of the hole into a processing time memory, a step of calculating a total processing time necessary to machine the product by adding up the processing time of each portion stored in the processing time memory, and a step of converting the total processing time to a processing cost of processing the product in consideration of a cost per the processing time.

Moreover, the method of preparing an estimate preferably includes a step of specifying types or a number of processing machines necessary to machine the product, a step of calculating for each of the processing machines a period of time when each of the processing machines operates to machine the product, a step of reading out a future processing schedule of each of the processing machines (each future processing schedule including an operating time in each date and time in future) in a factory stored in a memory, a step of allocating a work time for manufacturing the product to each of the processing machines in accordance with a result of the reading-out, and a step of calculating a delivery time necessary to manufacture the product and deliver the product to a customer based on a result of the allocation.

Moreover, the method preferably includes a step of providing the three-dimensional view or the development together with the estimate to a customer, a step of modifying the three-dimensional view or the development by use of a computer in accordance with a request of the customer for change in shape or dimensions of the product; a step of modifying a work time and a required-processing cost when needed, and a step of providing a written estimate including the modified three dimensional view and the modified development and the modified processing cost to the customer (through the Internet) again.

According to another technical aspect of the present invention, the present invention is a method of manufacturing a product in accordance with an order from a customer, the method including a step of preparing a written estimate, a step of preparing CAM data based on data of the three dimensional view and/or data of the development when the order is accepted, and a step of operating a sheet-metal working machine based on the CAM data to manufacture the product.

BRIEF DESCRIPTION OF THE DRAWINGS

FIG. 11 is an explanatory view illustrating calculation of a machining cost (deburring).

FIG. 12 is an explanatory view illustrating calculation of a processing cost (bending).

FIG. 19 is a screen view of an estimate sheet.

FIG. 20 is a screen view following that of FIG. 19.

BEST MODE FOR CARRYING OUT THE INVENTION

Figure 1:
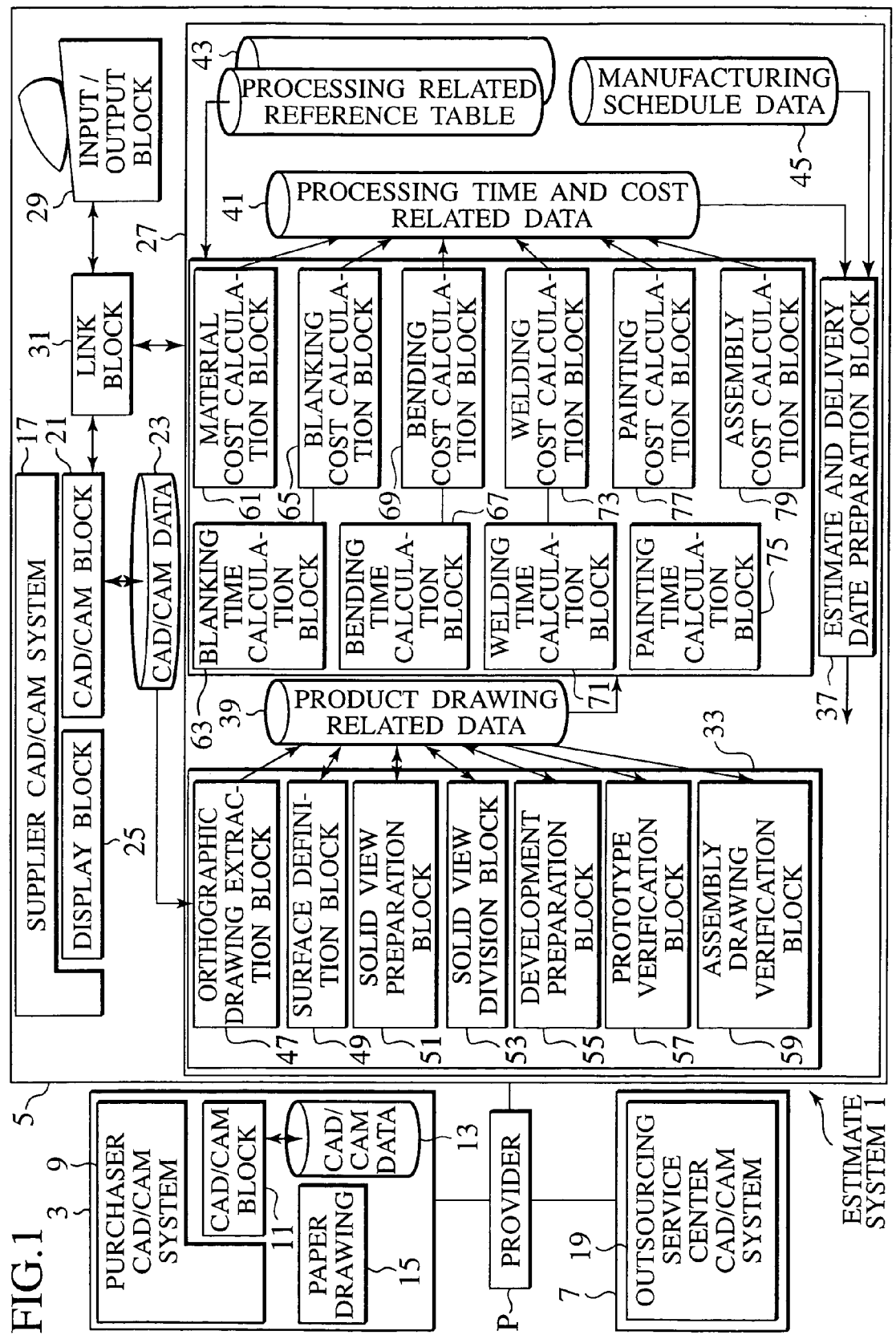
FIG. 1 is a schematic view schematically illustrating an estimate system.

An embodiment of the present invention will be described with reference to the drawings. FIG. 1 is a block diagram schematically showing an estimate system 1 according to the embodiment.

Referring to FIG. 1, the estimate system 1 includes a purchaser 3 that requests for manufacturing of a product, a supplier 5 that manufactures the requested product, and an outsourcing center 7 that performs, for example, part of services of the supplier 5. The purchaser 3, the supplier 5 and the outsourcing center 7 are in a state capable of communicating with each other via, for example, a provider P. In the embodiment, a description will be given regarding a case where the supplier 5 makes an estimate. When the supplier 5 is not provided with the estimate system, the outsourcing center 7 offers an estimate service for the supplier 5.

The purchaser 3 is provided with a purchaser CAD/CAM system 9. The CAD/CAM system 9 includes a CAD/CAM block 11 which designs a product and a CAD/CAM data file 13 which stores designed CAD drawings and the like. The purchaser 3 also holds a paper drawing 15 in which the product is designed.

The supplier 5 is provided with a supplier CAD/CAM system 17. The outsourcing center 7 is provided with an outsourcing service center CAD/CAM system 19.

Each of the CAD/CAM systems is composed of a computer and includes, for example, a not-shown computer body (including a storage unit), a display block, an input/output device, and the like.

The supplier CAD/CAM system 17 includes a CAD/CAM block 21 and a CAD/CAM data file 23 which stores diagrammatic data and the like created in the CAD/CAM block 21. CAD/CAM data is displayed on a display block 25 as diagrams.

The CAD/CAM block 21, a delivery date/estimate preparation management section 27 and an input/output block 29 are connected to each other via a link block 31. Thus, the delivery date/estimate preparation management section 27 can read the CAD/CAM data and can perform editing and the like of the CAD/CAM data.

The delivery date/estimate preparation management section 27 includes a product figure editing subsection 33, a processing time and cost calculation subsection 35, and an estimate/delivery date preparation block 37. In addition, the delivery date/estimate preparation management section 27 includes a product drawing related data file 39, a processing time and cost related data file 41, a processing related reference table 43, and a manufacturing schedule data file 45.

The product figure editing subsection 33 includes an orthographic drawing extraction block 47, a surface definition block 49, a solid view preparation block 51, a solid view division block 53, a development preparation block 55, a prototype verification block 57, and an assembly drawing verification block 59.

The orthographic drawing extraction block 47 extracts figure data of an orthographic drawing from CAD data of product drawings stored in the CAD/CAM data file 23 and stores the figure data in the product drawing related data file 39. An electronic drawing is prepared with CAD from a paper design drawing (orthographic drawing) sent by the purchaser 3 and stored in the CAD/CAM data file 23. Sometimes, the purchaser 3 sends a design drawing as electronic drawing data. In this case, the design drawing is converted and then stored in the CAD/CAM data file 23.

The surface definition block 49 reads the figure data of the orthographic drawing from the product drawing related data file 39. For example, the surface definition block 49 determines front, side, and top views of the product. In addition, the surface definition block 49 creates bending lines and the like by synthesis of these surfaces and stores the bending lines in the product drawing related data file 39. Thus, a solid model can be defined from the plan views.

The solid view preparation block 51 adds, for example, sheet thickness lines or the like to the orthographic drawing having surfaces defined and prepares a solid view as a solid model.

The solid view division block 53 adds, for example, an attribution for division to ridgelines, by which the product is divided, on the solid view and then divides the product into a plurality of components. Component data created after the division is stored into the product drawing related data file 39.

The development preparation block 55 develops each of the plurality of divided components while allowing for elongation values due to bending or the like. Development data obtained by developing is stored in the product drawing related data file 39. An area and the like of the development can be calculated with reference to the development data.

The prototype verification block 57 simulates the bending for each component containing a bending portion and verifies whether the bending can be actually performed. When a bending process and the like are decided, data for the bending process is stored in the product drawing related data file 39 in association with the component data. Thus, a bending cost and the like can be calculated.

In order to assemble the plurality of components to complete the product, the assembly drawing verification block 59 verifies assembly, welding, painting and the like of the components and then stores results thereof in the product drawing related data file 39. Thus, an assembly cost, a welding cost, a painting cost and the like can be calculated.

The processing time and cost calculation subsection 35 includes a material cost calculation block 61, a blanking time calculation block 63, a blanking cost calculation block 65, a bending time calculation block 67, a bending cost calculation block 69, a welding time calculation block 71, a welding cost calculation block 73, a painting time calculation block 75, a painting cost calculation block 77, and an assembly cost calculation block 79.

The material cost calculation block 61 is a processing block which reads the development data and the like from the product drawing related data file 39, reads a unit cost per sheet thickness of a material from the processing related reference table 43, and calculates a material cost. The material cost is stored in the processing time and cost related data file 41.

The blanking time calculation block 63 calculates time taken to perform contour machining for a developed shape of the component by, for example, laser machining or NC turret punch press machining. Data of the time is then stored in the processing time and cost related data file 41.

The blanking cost calculation block 65 calculates a blanking cost from the machining time obtained in the blanking time calculation block 63 with reference to a cost per unit machining time from the processing related reference table. The blanking cost is then stored in the processing time and cost related data file 41.

The bending time calculation block 67 reads the data of the bending lines and the like added to the development and calculates bending time with reference to standard bending time and the like from the processing related reference table 43. The bending time is stored in the processing time and cost related data file 41.

The bending cost calculation block 69 reads the bending time, refers to a bending cost per unit time from the processing related reference table 43, and calculates a bending cost. Data of the bending cost is stored in the processing time and cost data file 41.

The welding time calculation block 71 reads welding portions from the divided solid view, reads a processing time per unit welding and the like from the processing related reference table 43, and calculates a welding time. Data of the welding time is stored in the processing time and cost related data file 41.

The welding cost calculation block 77 reads the welding time, refers to a welding cost per unit time and the like from the processing related reference table 43, and calculates a welding cost. Data of the welding cost is stored in the processing time and cost related data file 41.

The painting time calculation block 75 reads a painting time per unit painting from the processing related reference table 43, and calculates a painting time. Data of the painting time is stored in the processing time and cost related data file 41.

The painting cost calculation block 77 reads the painting time, reads a painting cost per unit processing time from the processing related reference table 43, and calculates a painting cost. Data of the painting cost is stored in the processing time and cost related data file 41.

The assembly cost calculation block 79 calculates an assembly cost based on the result of the verification of assembly. Data of the assembly cost is stored in the processing time and cost related data file 41.

The estimate/delivery date preparation block 37 reads the blanking time, the bending time, the welding time, the painting time, and the assembly time from the processing time and cost related data file 41. The estimate/delivery date preparation block 37 also reads data of a manufacturing schedule currently arranged from the manufacturing schedule data file 45 and then incorporates each processing time into the current manufacturing schedule to calculate a delivery date.

The estimate/delivery date preparation block 37 calculates a cost for manufacturing the product by reading each of the processing costs from the processing time and cost related data file 41.

After the delivery date and the cost are calculated, the delivery date and the cost are sent to the purchaser CAD/CAM system 9. When the purchaser 3 formally requests for manufacturing of the product in response to the delivery date and the cost, since the supplier 5 has already made preparation for manufacturing the product (designing of the product, preparation of NC data and the like), a period of time from the request to delivery of the product is shortened.

Figure 2:
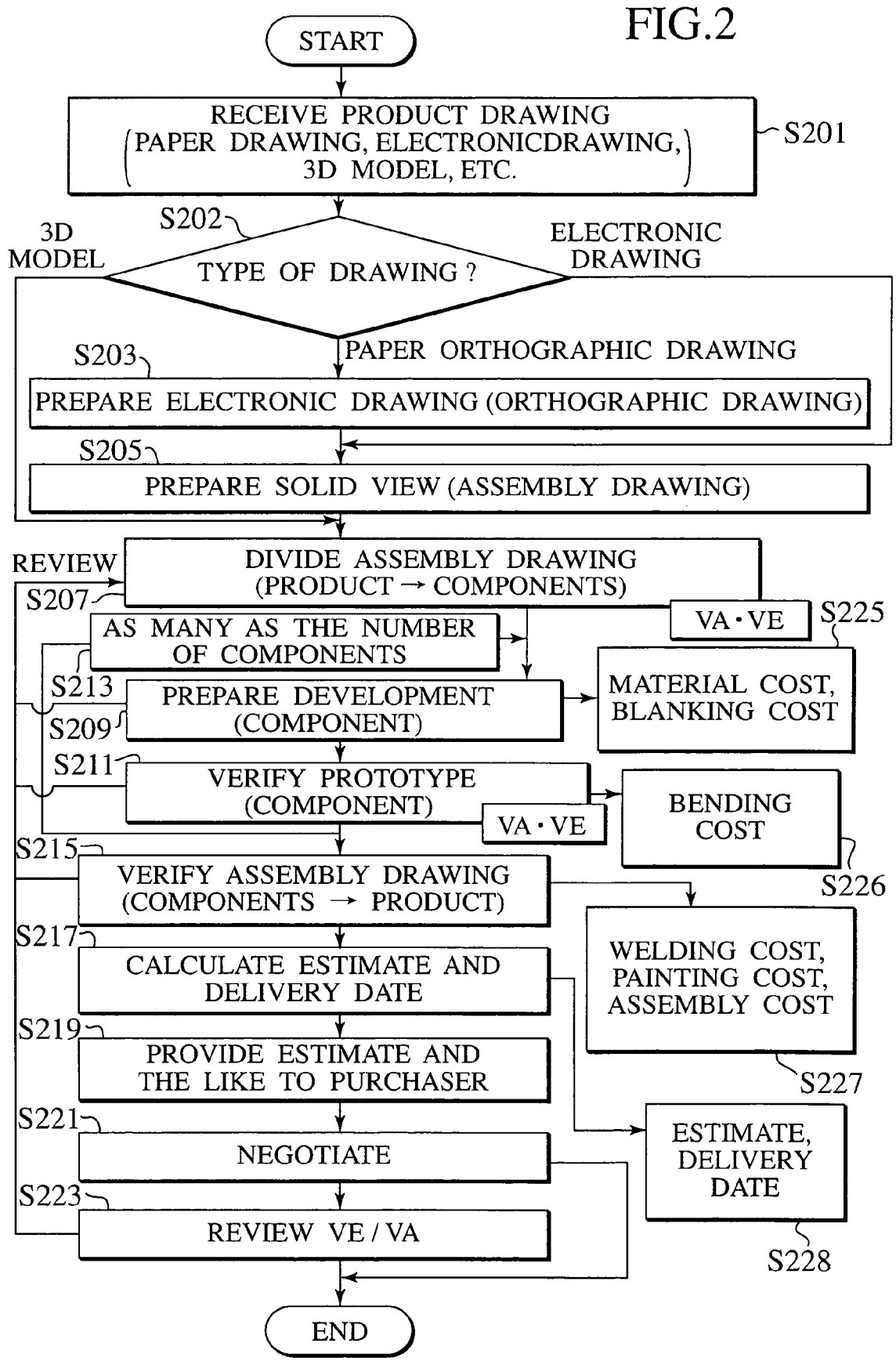
FIG. 2 is a flow chart showing an operation of the estimate system.

Operations of a method of preparing the estimate and the delivery date will be described with reference to FIGS. 2 to 22. FIG. 2 shows an operation of the system according to the present invention in a flowchart.

In step S201, the supplier 5 is given a paper drawing in which a product is drawn, an electronic drawing in which the product is prepared by CAD or the like, or three-dimensional CAD data which is modeled on the product by three-dimensional CAD or the like and receives a request for an estimate from the purchaser 3, which is a customer.

<Electronic Drawing Preparation>

Figure 3:
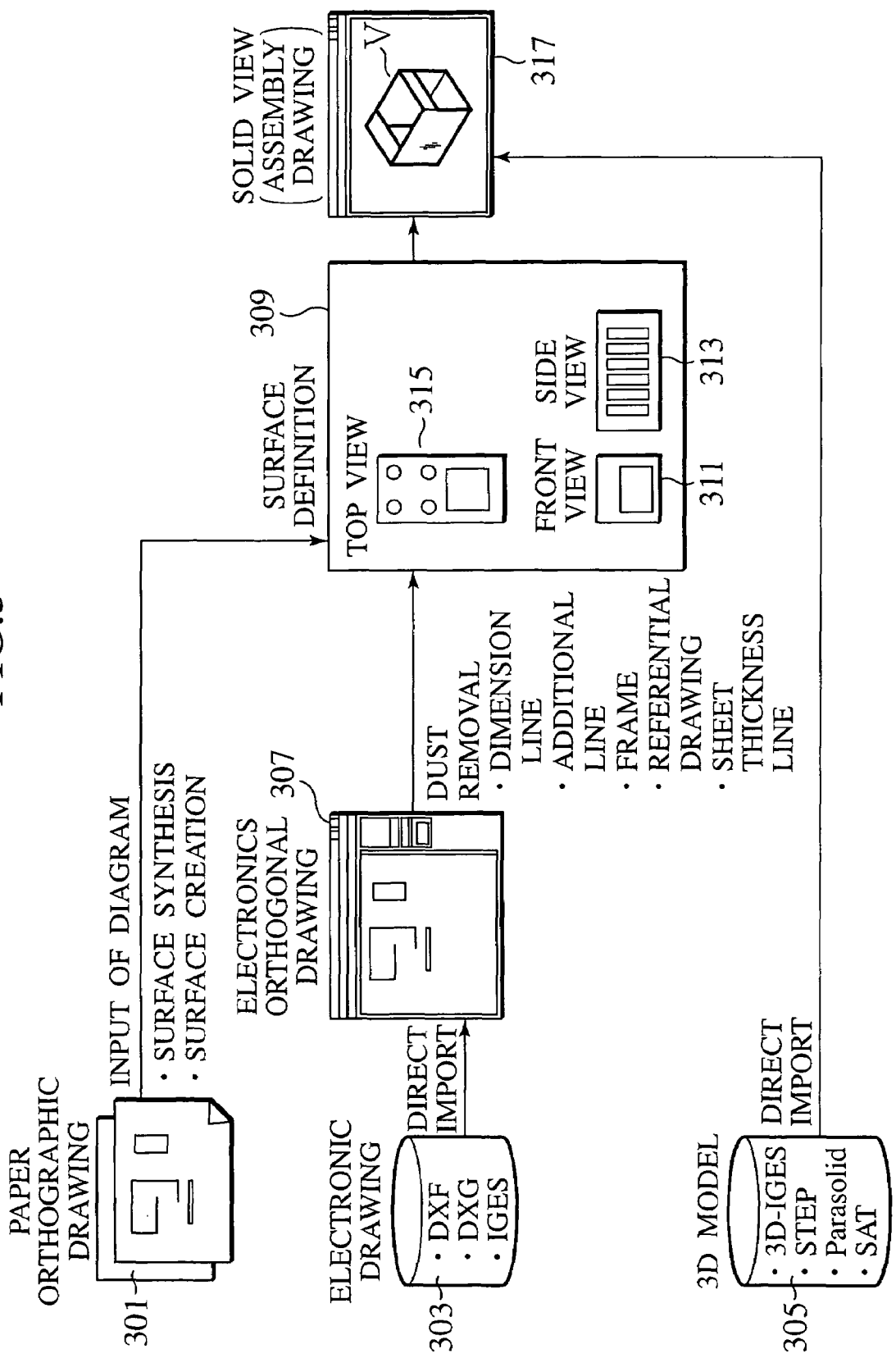
FIG. 3 is an explanatory view illustrating preparation of a solid view by reading of an orthographic drawing.

FIG. 3 shows types of a drawing which the supplier 5 receives. In the figure, the supplier 5 receives a paper orthographic drawing 301, a case where the supplier 5 receives an electronic drawing 303, and a case where the supplier 5 receives a 3D model. The following process varies depending on the type of the received drawing. Accordingly, when the paper orthographic drawing 301 is received, the process proceeds to step S203, when the electronic drawing 303 is received, the process proceeds to step S205, and when the 3D model 305 is received, the process proceeds to step S207 (step S202).

In step S203, since the received drawing is the paper orthographic drawing 301, a CAD drawing is prepared with reference to the paper orthographic drawing 301.

<Solid View Preparation>

Instep S205, a solid view which is a three-dimensional solid shape is prepared from a two-dimensional CAD drawing. Although a method of preparing the three-dimensional solid view from the two-dimensional drawing is publicly known, an outline thereof will be described.

Referring to FIG. 3, unnecessary elements for creating the solid view, such as, for example, dimension lines, additional lines, frames, referential drawings, and sheet thickness lines, are removed from an electronic orthographic drawing two-dimensionally created. As a result, a front view 311, a side view 313, and a top view of the product are displayed on a screen 309. The front view 311, the side view 313, and the top view are correlated with each other while allowing for bending positions. By adding data such as a sheet thickness to these views, a solid view V is prepared and displayed on a screen 317.

<Product Division>

In step S207, dividing positions on the product are instructed in the solid view V to perform division of the product (operation of dividing the product into a plurality of components).

Figure 4:
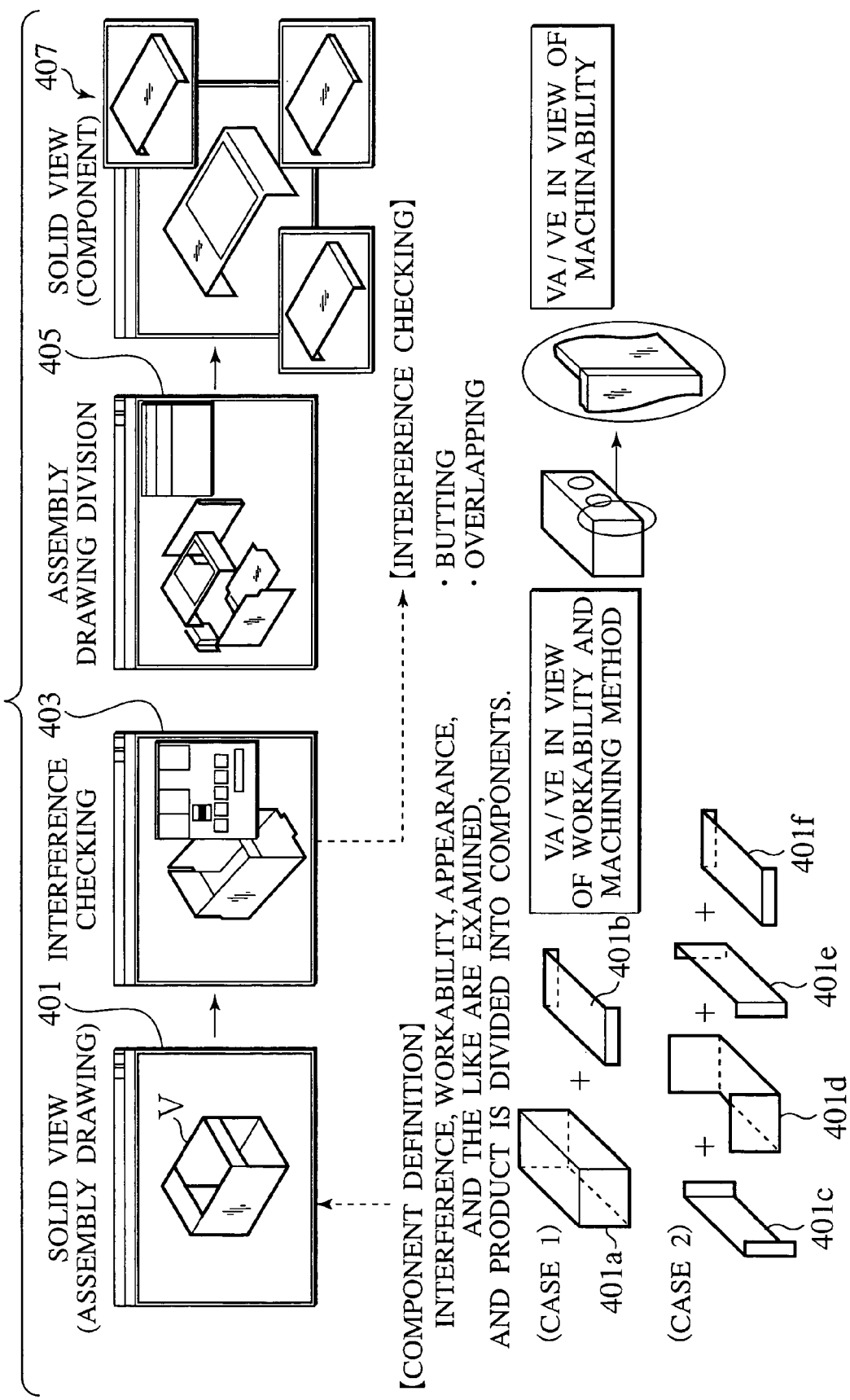
FIG. 4 is an explanatory view illustrating division of the solid view.

The operation of dividing the product into a plurality of components will be described with reference to FIG. 4. The solid view V prepared in step S203 is displayed on a screen 401. On this screen, interference, workability, appearance, and the like of the product are examined with reference to the solid view V. For example, examination is made for a case (case VA) of dividing the product into components 401a and 401b in consideration of an assembly cost of the product, a case (case VE) of dividing the product into components 401c, 401d, 401e, and 401f in consideration of facility of a processing method, and the like.

Examination results of the case VA considering the workability and of the case VE considering the processing method are stored in a memory as character data.

Interference between the components, which can occur when the product is divided into the components, is checked on a screen 403. Results of determination of machinability in the cases VA and VE, which is examined by the interference checking, are stored in the memory as character data.

On a screen 405, it is confirmed how the product is divided. Screens 407 are designed to display each of the divided components on one screen. Thus, a development can be prepared for each component. In step S209, the development preparation processing block 55 prepares the development for each of the plurality of divided components.

<Development Preparation>

Figure 5:
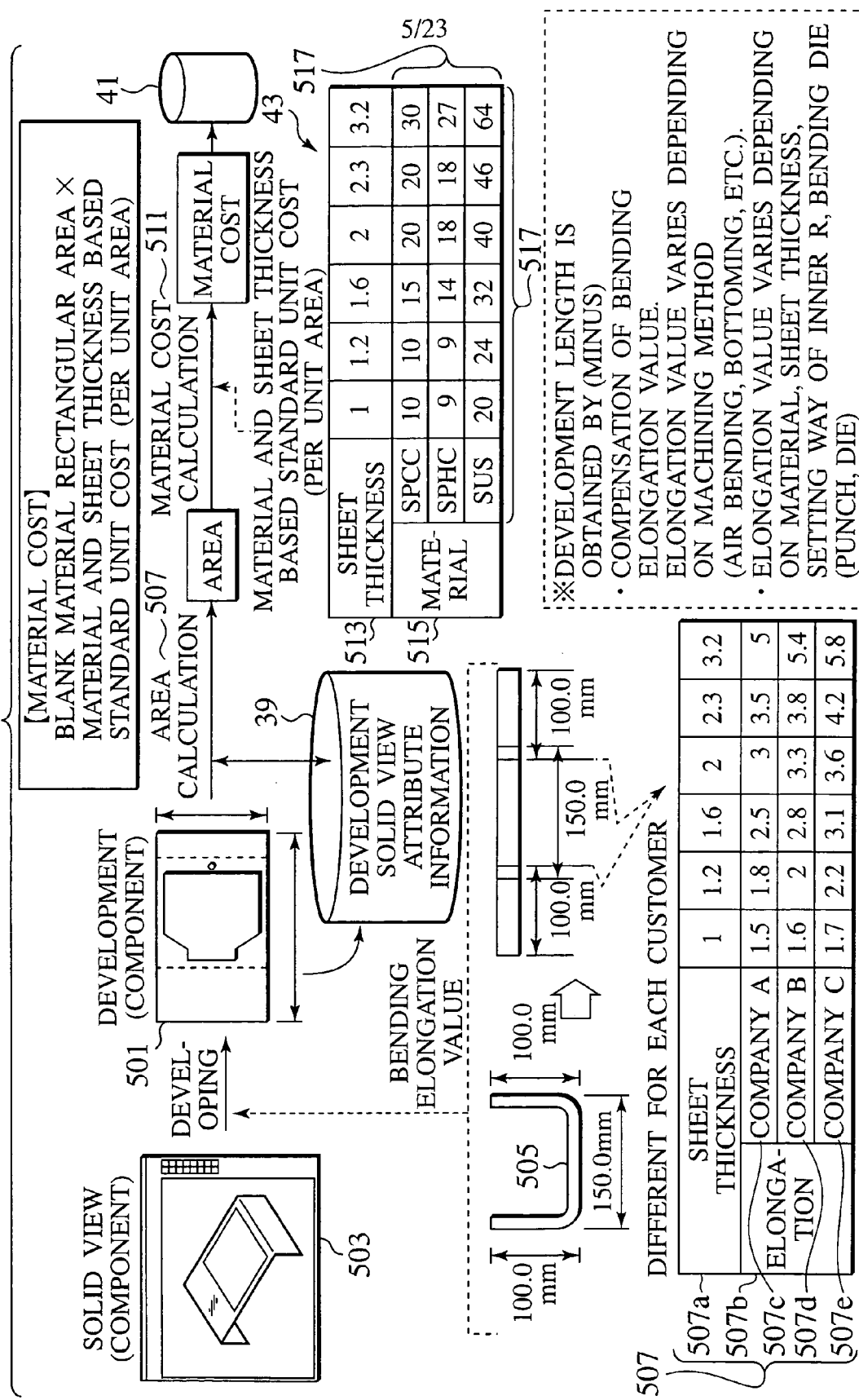
FIG. 5 is an explanatory view illustrating preparation of a development.
Figure 6:
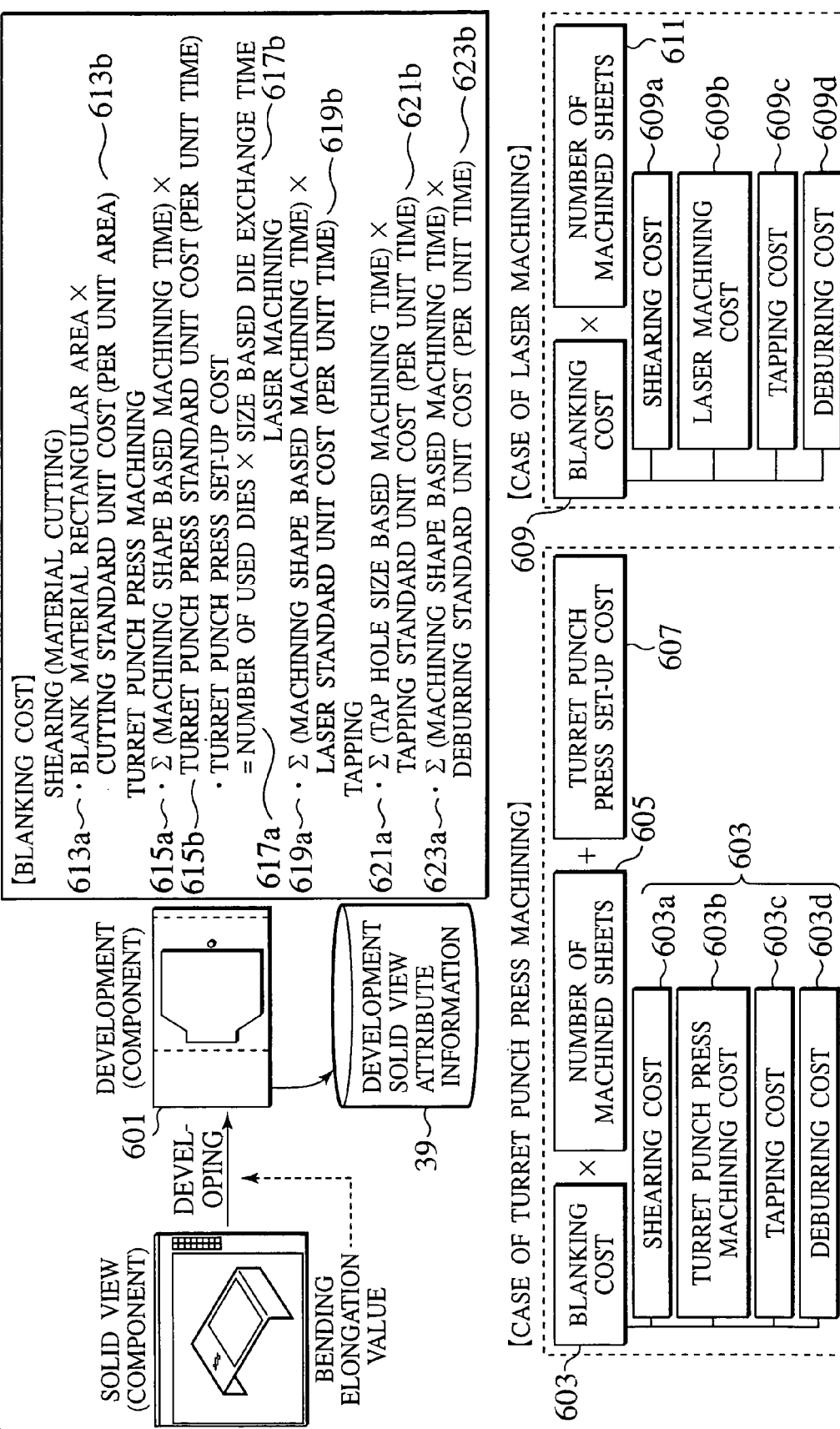
FIG. 6 is an explanatory view illustrating calculation of a blanking cost.
Figure 7:
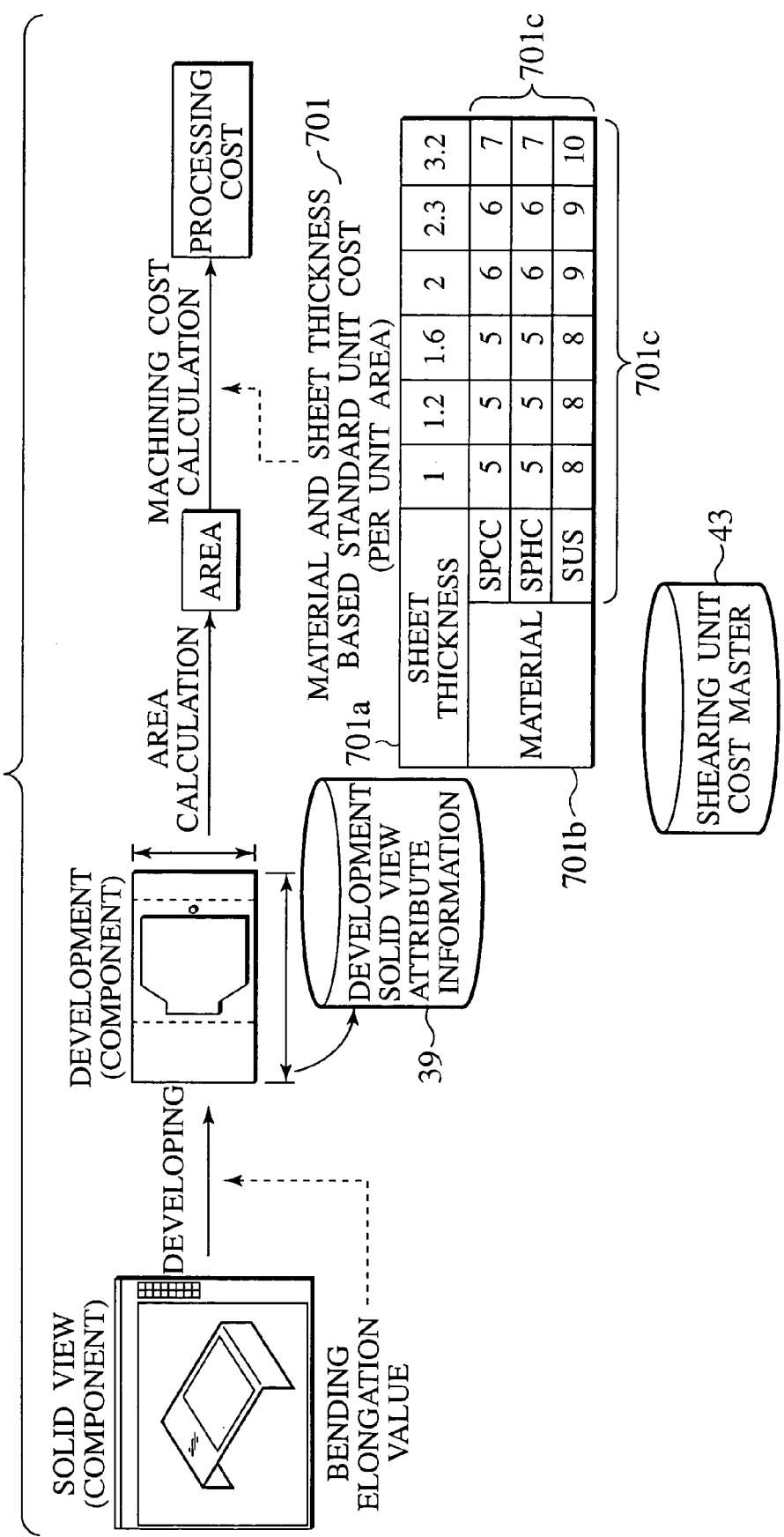
FIG. 7 is an explanatory view illustrating calculation of a material cost.

A method of preparing a development 501 will be described with reference to FIG. 5. A solid view of the divided component is displayed on a screen 503. The development 501 is prepared from the solid view of the component. Herein, when a bending portion 505 is developed, a bending elongation value is taken into consideration. For example, when the bending portion 505 is developed, the developing is performed with reference to a table 507. The table 507 includes sheet thickness fields 507a and elongation value fields 507b. In the elongation value fields 507b, the elongation values are set for each company (for example, company A 507c, company B 507d, and company C 507e). Specifically, when the purchaser 3 is the company A 507c and the sheet thickness of the product is 1, it is set that the sheet metal is elongated by 1.5 in bending. The development 501 is prepared in consideration of this elongation value. Accordingly, the development 501 is prepared so as to have a dimension obtained by subtracting the bending elongation value.

Area calculation 507 is performed with the development 501. Material cost calculation 511 is then performed with reference to the processing related reference table 43. In the processing related reference table 43, unit prices of a plurality of materials 515 (for example, SPCC, SPHC, and SUS) are registered in price fields 517 corresponding to each thickness field 513. Data of a material cost is stored in the processing time and cost related data file 41.

Blanking

A blanking time and a blanking cost are calculated with reference to the development (S225). A method of calculating the blanking time and the blanking cost will be described with reference to FIG. 6. Data of a development 601 is read from the product drawing related data file 39 storing the development 601. There are machining by a turret punch press and machining by a laser machining machine in the case of blanking.

A machining cost in the case of machining by the turret punch press is a value obtained by multiplying a blanking cost 603 of blanking a developed shape by a number 605 of sheets to be machined and adding a turret punch press set-up cost 607 thereto. The blanking cost 603 includes a shearing cost 603a, a turret punch press machining cost 603b, a tapping cost 603c, and a deburring cost 603d.

The machining cost in the case of machining by laser machining is a value obtained by multiplying a blanking cost 609 of blanking the developed shape by a number 611 of sheets to be machined. The blanking cost 609 includes a shearing cost 609a, a laser machining cost 609b, a tapping cost 609c, and a deburring cost 609d. A method of calculating a cost of each machining will be described below.

Shearing

In the case of shearing, a blank material rectangular area 613a is multiplied by a cutting standard unit cost 613b (per unit area). The cutting standard unit cost will be described with reference to FIG. 7. Material fields 701b (for example, SPCC, SPHC, SUS, and the like) are set corresponding to a plurality of sheet thickness fields 701a. Unit cost fields 701c are provided by sheet thickness and material, and unit costs are set therein. These data are stored in the processing related reference table 43 as a shearing unit cost master.

Turret Punch Press

In the case of the turret punch press, a value is calculated by multiplying a machining shape based machining time 615a (calculated from NC data) by a turret punch press standard unit cost 615b (per unit time). This calculation is performed for all machining shapes, and a total sum (for example, all developed shapes of components arranged on one sheet) is calculated. For a set-up cost, a die exchange time is calculated by multiplying a number 617a of dies to be used by a size based die exchange time, and then the die exchange time is multiplied by a unit cost (per unit time).

Figure 8:
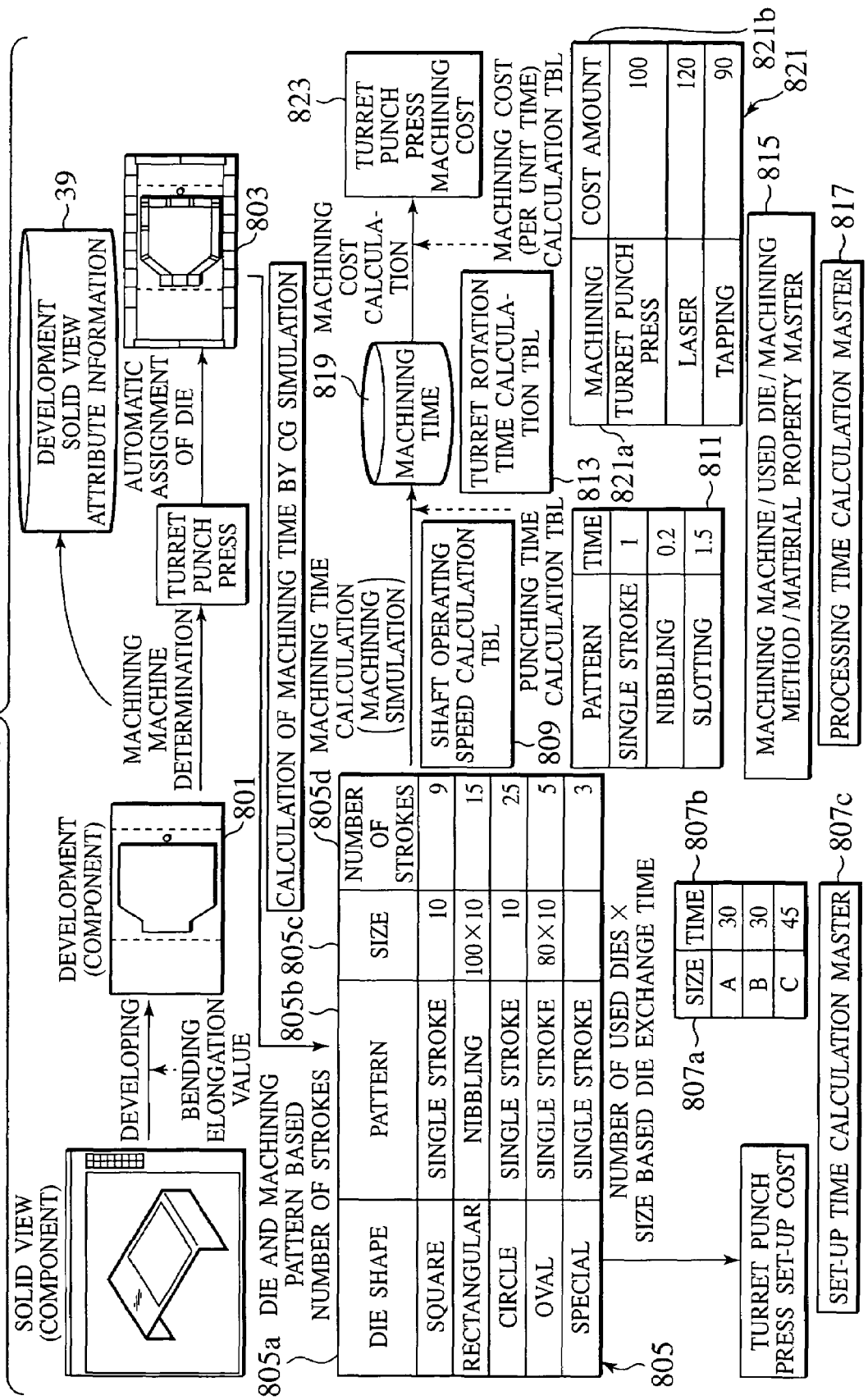
FIG. 8 is an explanatory view illustrating calculation of a machining cost (turret punch press).

Referring to FIG. 8, a detailed description will be further given. A development 801 is read and machining is decided to be performed by the turret punch press. Die machining data 803 is allocated to the development 801. A die shape 805a, a machining pattern 805b, a die size 805c, and a number 805d of strokes are extracted from the die machining data 803 while being correlated with each other. The die exchange times are set in time fields 807b corresponding to die sizes 807a as a set-up time setting master and stored in the processing related reference table 43. These die exchange times are read, and a total sum of set-up times for dies to be used is calculated. The set-up cost of the turret punch press is calculated by multiplying the total sum of the set-up times by the unit cost.

For calculation of the machining cost, CG simulation is performed with reference to an operating speed calculation table 809, a punching time calculation table 811, a turret rotation time calculation table 813, a machining machine/used die/machining method/material property master 815, and a machining time calculation master 817, all of which are stored in the processing related reference table 43, to calculate a machining time 819. A turret punch press machining cost 823 is then calculated from the calculated machining time 819 with reference to a machining cost calculation table 821. The machining cost calculation table 821 includes machining type fields 821a (turret punch press machining, laser machining, tapping, and the like) and cost amount fields 821b where cost amounts are set corresponding to the machining type fields 821a.

Laser Machining

Figure 9:
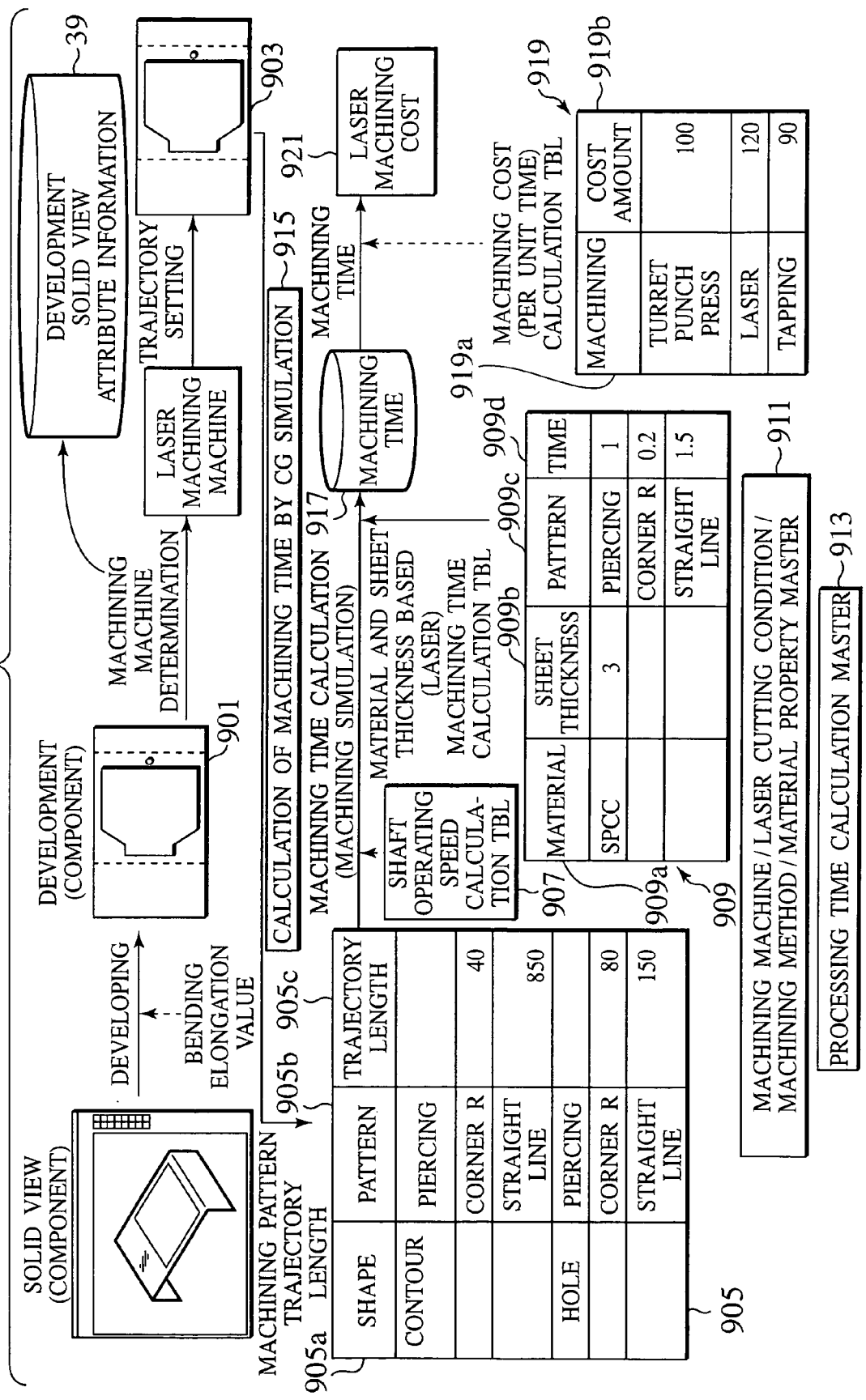
FIG. 9 is an explanatory view illustrating calculation of a machining cost (laser machining).
Figure 10:
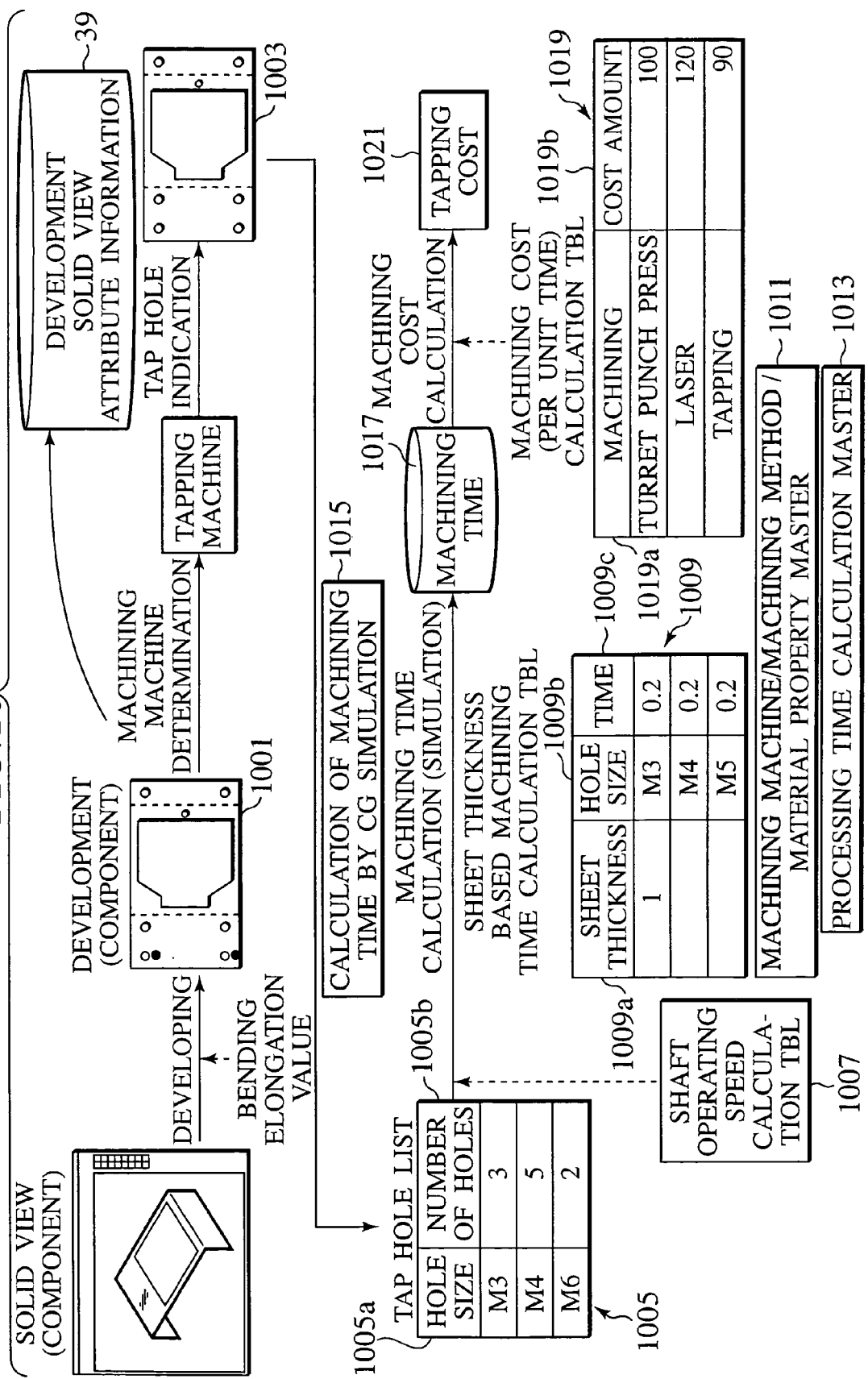
FIG. 10 is an explanatory view illustrating calculation of a machining cost (tapping).

In the case of the laser machining, a machining shape based machining time 619a is multiplied by a laser standard unit cost 619b (per unit time). This calculation is performed for all machining shapes, and a total sum is calculated. Referring to FIG. 9, a detailed description will be given regarding a method of calculating the laser machining cost. A development 901 is read, and a machining method is decided to be the laser machining. A machining trajectory 903 is then set. A machining shape 905a (for example, contour, hole, and the like), a pattern (for example, piercing, corner R, straight line, and the like), a trajectory length 905c are extracted from the machining trajectory 903 while being correlated with each other. Machining time calculation 915 is performed by CG simulation with reference to a shaft operating speed calculation table 907, a material and sheet thickness based (laser) machining time calculation table 909, a machining machine/laser cutting condition/machining method/material property master 911, and a machining time calculation master 913, all of which are stored in the processing related reference table 43. The material and sheet thickness based (laser) machining time calculation table 909 includes material fields 909a where materials are set, sheet thickness fields 909b where sheet thicknesses are set, pattern fields 909c where patterns are set, and time fields 909d where times are set. Thus, a unit machining time is specified for each material, each sheet thickness, and each pattern (for example, piercing, corner R, or straight line).

After a machining time 917 is obtained, a laser machining cost 921 is calculated with reference to a machining cost (per unit time) calculation table 919, which is stored in the processing related reference table 43. The machining cost (per unit time) calculation table 919 includes machining fields 919a where types of machining (for example, turret punch press, laser machining, tapping, and the like) are set and cost amount fields 919b where unit costs are set for the respective types. Thus, the unit cost for each machining type can be obtained.

Tapping

In the case of tapping, a value is calculated by multiplying a tap hole size based machining time 621a by a tapping standard unit cost 621b (per unit time). This calculation is performed as many times as the number of tap holes, and a total sum is calculated. A detailed description will be further given with reference to FIG. 10. A development 1001 is read, and a machining machine is decided to be a tapping machine. A tapping indication drawing 1003 is prepared, which indicates tapping positions. Hole sizes 1005a (for example, M3, M4, M6, and the like) and a number 1005b of holes corresponding to the hole sizes 1005a are extracted from the tapping indication drawing 1003. Machining time calculation 1015 is performed by CG simulation with reference to a shaft operating speed calculation table 1007, a sheet thickness based machining time calculation table 1009, a machining machine/machining method/material property master 1011, and a machining time calculation master 1013, all of which are stored in the machining related reference table 43, to calculate a machining time 1017. The sheet thickness based machining time calculation table 1009 includes sheet thickness fields 1009a where sheet thicknesses are set, hole size fields 1009b where hole sizes (for example, M3, M4, M5, and the like) are set for each sheet thickness, machining time fields 1009c where machining times are set corresponding to the respective hole sizes.

The machining time 1017 is read, and a tapping cost 1021 is obtained with reference to a machining cost (per unit time) calculation table 1019. The machining cost (per unit time) calculation table 1019 includes machining fields 1019a where types of machining (for example, turret punch press, laser machining, tapping, and the like) are set and cost amount fields 1019b where machining unit costs are set corresponding to the types of machining.

Deburring

In the case of deburring, a value is calculated by multiplying a machining shape based machining time 623a by a deburring standard unit cost 623b (per unit time). This calculation is performed for all machining shapes, and a total sum is calculated. A detailed description will be further given with reference to FIG. 11. A development 1101 is read, and a machining machine is decided. A machining trajectory allocated diagram 1103 is prepared from the development 1101. A machining trajectory 1105 is extracted from the machining trajectory allocated diagram 1103. Machining time calculation 1115 is then performed by CG simulation with reference to a shaft operating speed calculation table 1107, a sheet thickness based machining time calculation table 1109, a machining machine/machining method/material property master 1111, and a machining time calculation master, all of which are stored in the processing related reference table 43, to calculate a machining time 1117. The sheet thickness based machining time calculation table 1109 includes sheet thickness fields 1109a where sheet thicknesses are set and time fields 1109b where times taken for machining are set corresponding to the sheet thicknesses.

A deburring cost 1121 is calculated from the machining time 1117 with reference to a machining cost (per unit time) calculation table 1119. The machining cost (per unit time) calculation table 1119 includes machining fields 1119a where types of machining (for example, turret punch press, laser machining, tapping, deburring, and the like) are set and cost amount fields 1119b where cost amounts are set for the respective types of machining.

<Prototype Verification>

In step S211, prototype verification is performed. Referring to FIG. 12, a detailed description will be given regarding the prototype verification. In the prototype verification, prototype verification 1203 is performed, which examines, for example, which dies are used and which processes are applied to bend a development 1201. Results of the prototype verification 1203 are stored in text data as a VA/VE result 1203a by machineability and a VA/VE result 1203b by workability and a processing method.

A value is calculated by multiplying a bending cost 1205 for each development by a number 1207 of workpieces to be machined and adding thereto a bending set-up cost 1209, and further adding thereto a special die purchase cost 1211 if a special die is purchased (step S226).

Specifically, for the bending cost 1205, a bending shape based processing time 1213a is multiplied by a bending standard unit cost (per unit time) 1213b. This calculation is performed for all bending portions included in the development, and a total sum is calculated. For the bending set-up cost 1209, a value is calculated by multiplying a number 1215a of dies to be used by a die exchange time.

Figure 13:
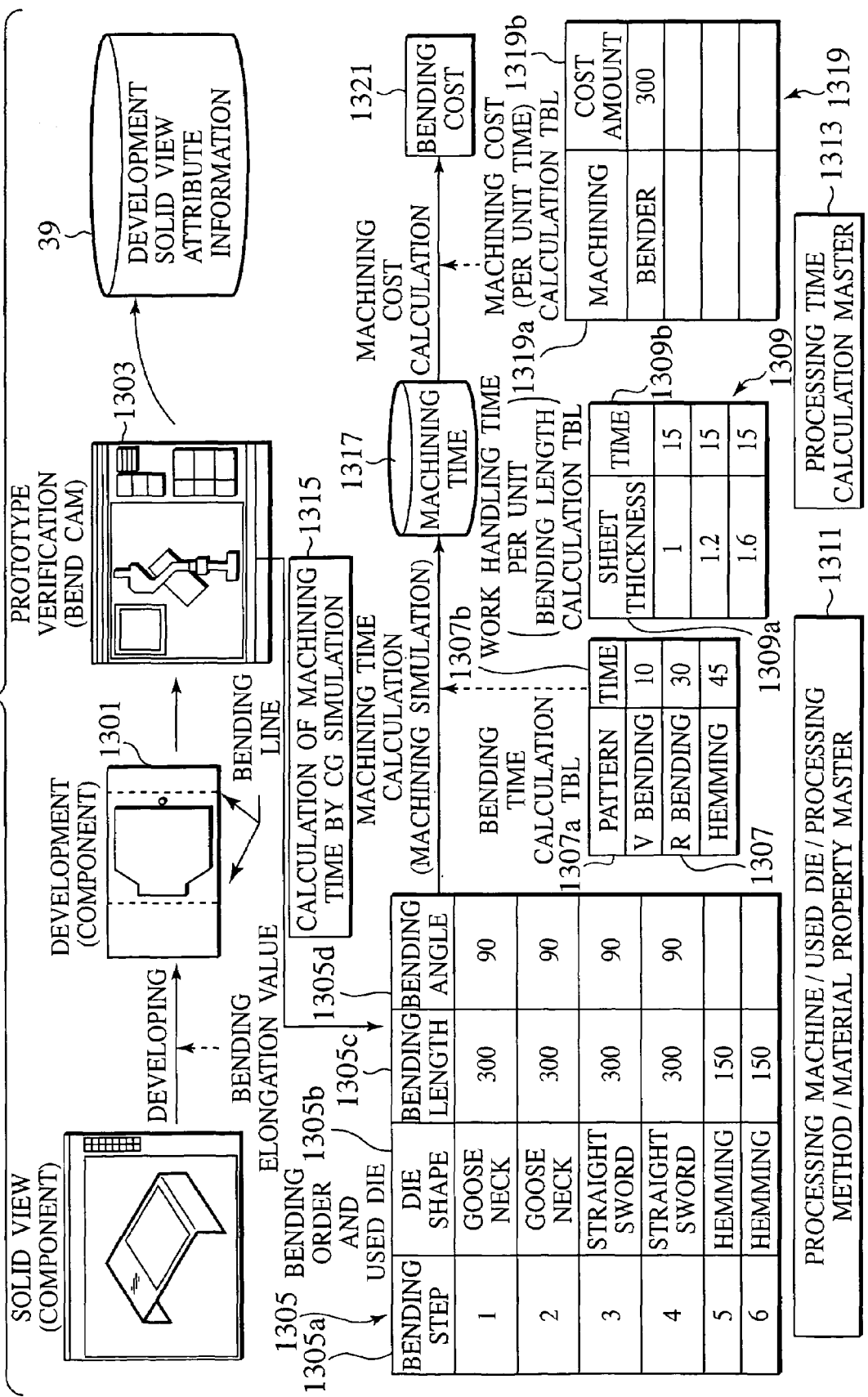
FIG. 13 is an explanatory view illustrating calculation of the processing cost (bending).

FIG. 13 shows a method of calculating the bending cost in detail. A development 1301 is read, and the prototype verification is performed. Bending steps 1305a, die shapes 1305b, bending lengths 1305c, bending angles 1305d, and the like are read from the development and the like subjected to the prototype verification. Processing time calculation 1315 is then performed by CG simulation with reference to a bending time calculation table 1307, a work handling time (per unit bending length) calculation table 1309, a processing machine/used die/processing method/material property master 1311, a processing time calculation master 1313, all of which are stored in the processing related reference table 43. As a result, a processing time 1317 is calculated. The bending time calculation table 1307 includes pattern fields 1307a where bending patterns are set and time fields 1307b where processing times for the respective bending patterns are set. The work handling time (per unit bending length) calculation table 1309 includes sheet thickness fields 1309a where sheet thicknesses are set and time fields where processing times for the respective sheet thicknesses are set.

The processing time 1317 is read, and a bending cost 1321 is calculated with reference to a processing cost (per unit time) table 1319, which is stored in the processing related reference table 43. The processing cost (per unit time) table 1319 includes processing fields 1319a where processing methods (bender and the like) are set and cost amount fields 1319b where cost amounts are set.

Figure 14:
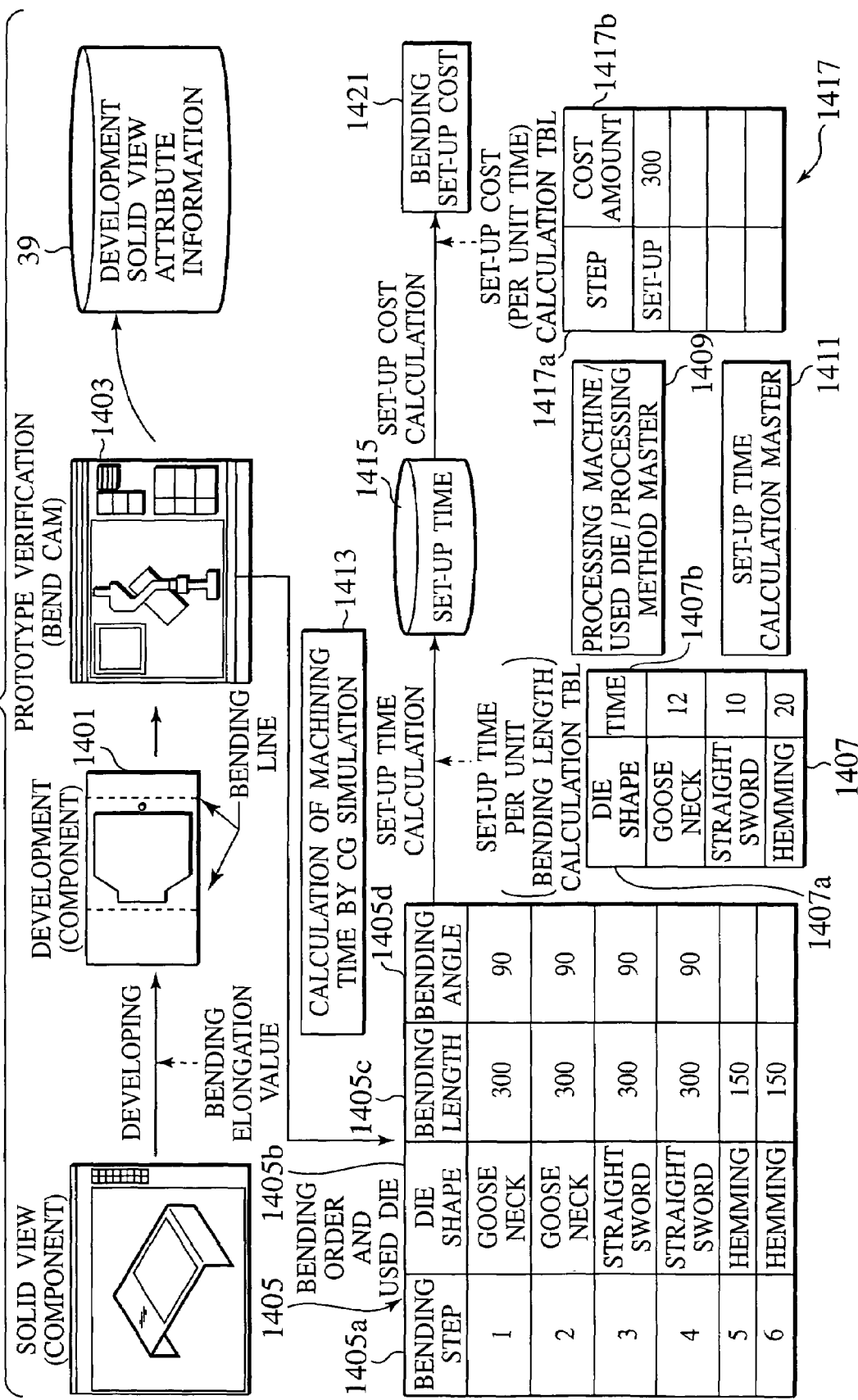
FIG. 14 is an explanatory view illustrating calculation of the processing cost (bending).

FIG. 14 shows a method of calculating the bending set-up cost in detail. A development 1401 is read, and the prototype verification is performed. Bending steps 1405a, die shapes 1405b, bending lengths 1405c, bending angles 1405d, and the like are read from the development and the like subjected to the prototype verification. Processing time calculation 1413 is performed by CG simulation with reference to a set-up time (per unit bending length) calculation table 1407, a processing machine/used die/processing method/material property master 1409, a set-uptime calculation master 1411, all of which are stored in the processing related reference table 43. As a result, a set-up time 1415 is calculated. The set-up time calculation table 1407 includes die shape fields 1407a where die shapes are set and time fields 1407b where set-up times are set for the respective die shapes.

The set-up time 1415 is read, and a bending set-up cost 1419 is calculated with reference to a processing cost (per unit time) table 1417, which is stored in the processing related reference table 43. The processing cost (per unit time) table 1417 includes step fields 1417a where steps (set-up and the like) are set and cost amount fields 1417b where cost amounts are set.

Figure 15:
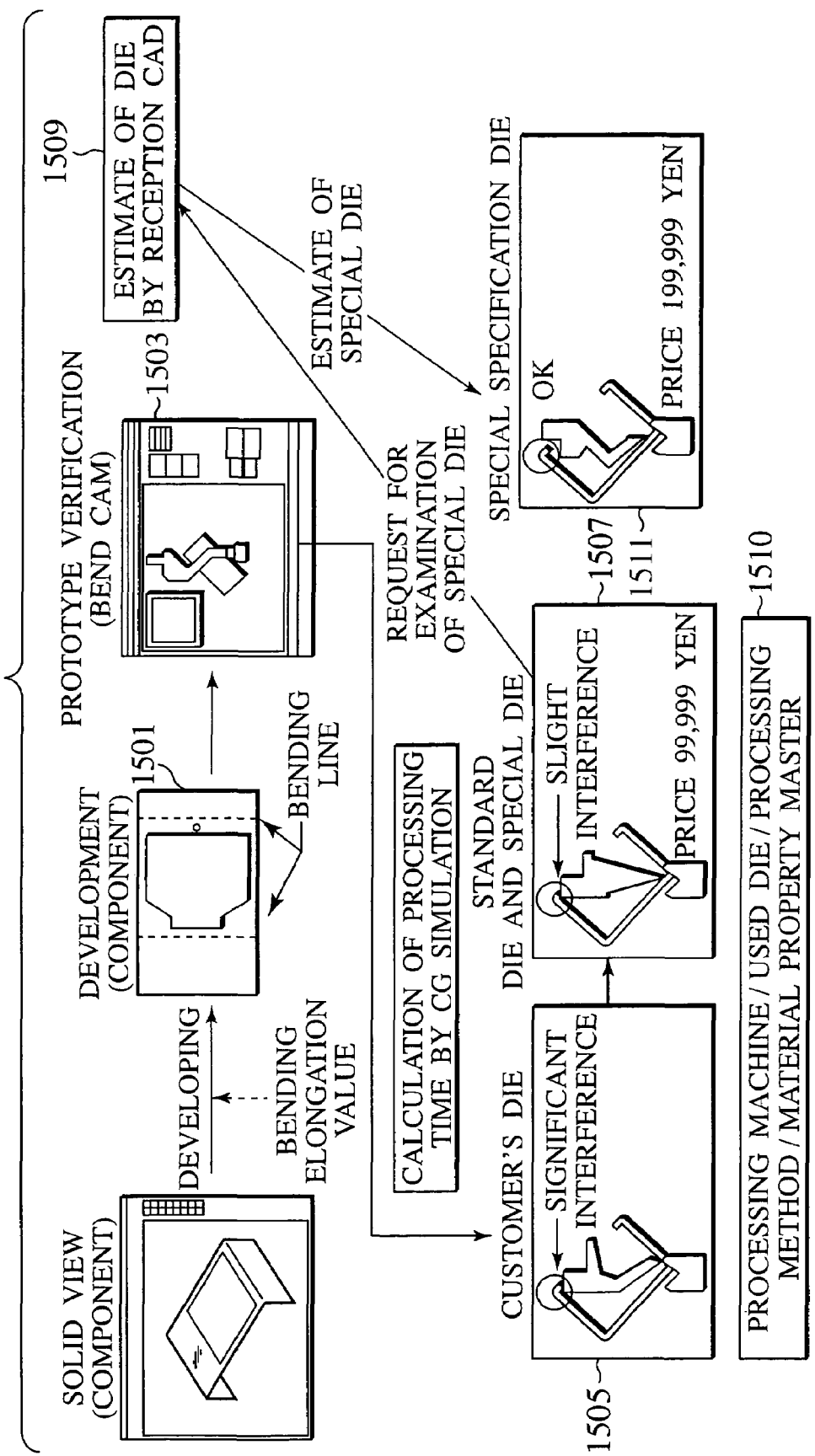
FIG. 15 is an explanatory view illustrating calculation of the processing cost (bending).

Referring to FIG. 15, a detailed description will be given regarding a method of calculating a special die cost. A development 1501 is read, and prototype verification 1503 is performed. As a result, in some cases, a die held by the supplier 5 significantly interferes with a component. In this case, a shape of a special die is determined, and a request is made to a die manufacturer for die estimation 1509. An estimate of a manufacturing cost of a special die 1511 provided here is the special die cost.

The above described processes are performed for all components obtained by dividing the product.

<Assembly Drawing Verification>

Figure 16:
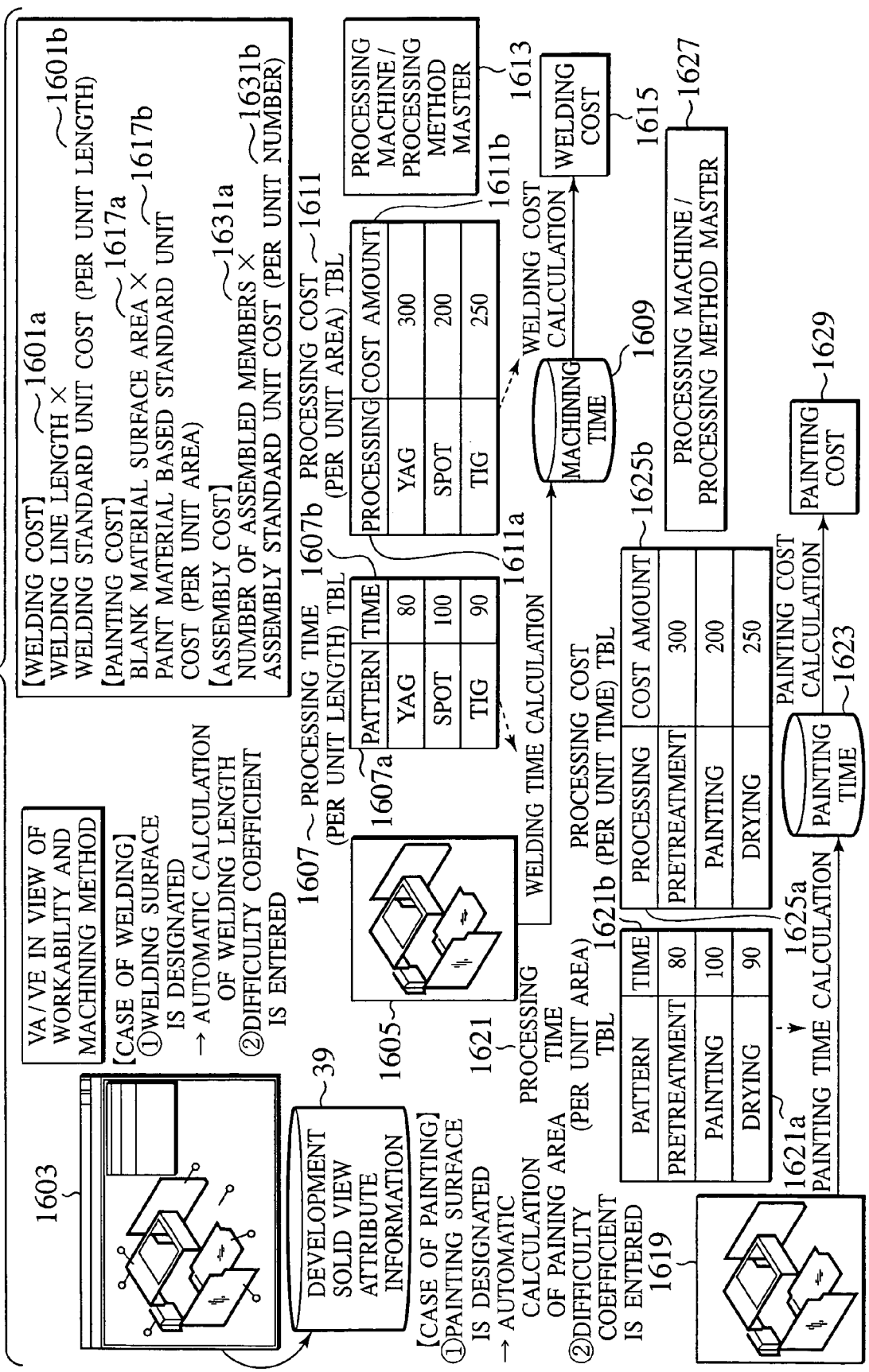
FIG. 16 is an explanatory view illustrating calculation of processing costs (welding, painting and assembly).

In step S215, an assembly drawing is verified. With this assembly drawing verification, a welding cost, a painting cost, and an assembly cost are calculated. Referring to FIG.16, a description will be given regarding a method of calculating the welding cost, the painting cost, and the assembly cost (step S227).

Welding Cost and Time

The welding cost is obtained by multiplying a welding line length 1601a by a welding standard unit cost 1601b (per unit length). Specifically, a solid view 1603 divided into a plurality of components is read, welding faces are designated, and welding length calculation 1605 is performed. Herein, a difficulty coefficient is added to each welding portion. A welding time 1609 is then calculated with reference to a processing time (per unit length) table 1607. The processing time (per unit length) table 1607 includes pattern fields 1607a where types of welding (for example, YAG, spot, TIG, and the like) are set and time fields 1607b where times taken for welding of the respective patterns per unit length.

The welding time 1609 is read, and a welding cost 1615 is calculated with reference to a processing cost table 1611 and a processing machine/processing method master 1613. The processing cost (per unit time) table 1611 includes processing fields 1611a where the types of welding (for example, YAG, spot, TIG, and the like) are set and cost amount fields 1611b where cost amounts for welding per unit time are set.

Painting Cost and Time

The painting cost is obtained by multiplying a blanking material surface area 1617a by a paint based standard unit cost (per unit area) 1617b.

Specifically, the solid view of the product divided into the plurality of components is read. Designation 1619 of painting surfaces is performed on the solid view. A painting time 1623 is calculated with reference to a processing time (per unit area) table 1621. The processing time (per unit area) table 1621 includes pattern fields 1621a where patterns (pretreatment, painting, drying, and the like) of steps are set and time fields 1621b where times per unit area taken for the steps of the respective patterns are set.

The painting time 1623 is read, and a painting cost 1629 is calculated with reference to a processing cost (per unit time) table 1625 and a processing machine/processing method master 1627. The processing cost (per unit time) table 1625 includes processing fields 1625a where types (pretreatment, painting, drying, and the like) of processing are set and cost amount fields 1625b where cost amounts per unit time for the respective types of processing are set.

Assembly Time and Cost

The assembly cost is obtained by multiplying a number 1631a of components to be assembled by an assembly standard unit cost (per unit number) 1631.

If there is a problem or the like in this assembly drawing verification, the processing is returned to step S207, and the division of the assembly drawing and the like are examined again.

<Estimate and Delivery Date Calculation>

Figure 17:
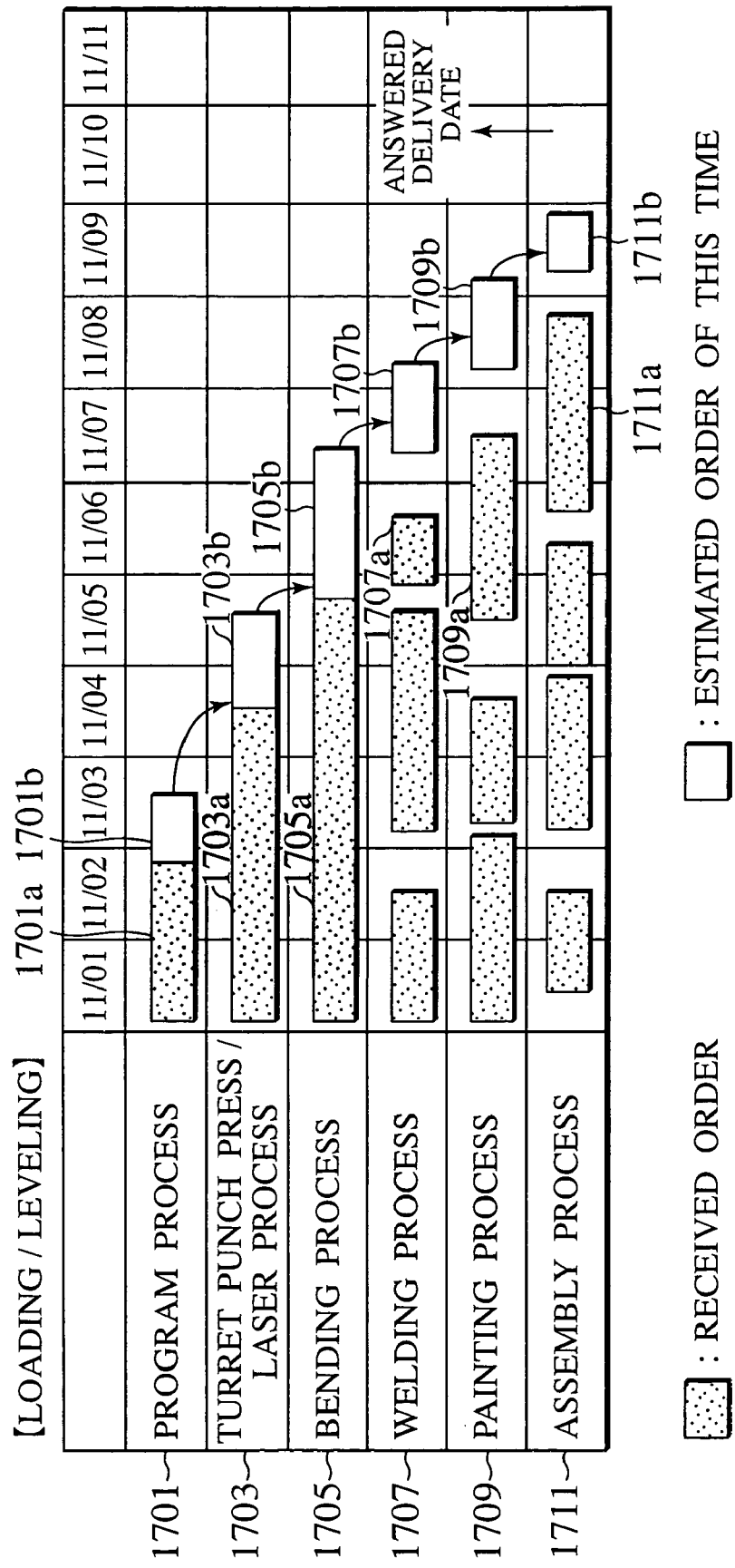
FIG. 17 is an explanatory view illustrating calculation of a delivery date.

Instep S217, an estimate and a delivery date are calculated. FIG.17 shows a method of determining the delivery date. For example, when processing processes for processing a product are a program process 1701, a turret punch press/laser process 1703, a bending process 1705, a welding process 1707, a painting process 1709, and an assembly process 1711, a present estimated order 1701b is incorporated in the program process 1701 after a received order 1701a.

A present estimated order 1703b is incorporated in the turret punch press/laser process 1703 after a received order 1703a. A present estimated order 1705b is incorporated in the bending process 1705 after a received order 1705a.

A present estimated order 1709b is incorporated in the painting process 1709 after a received order 1709a. A present estimated order 1711b is incorporated in the assembly process 1711 after a received order.

Figure 18:
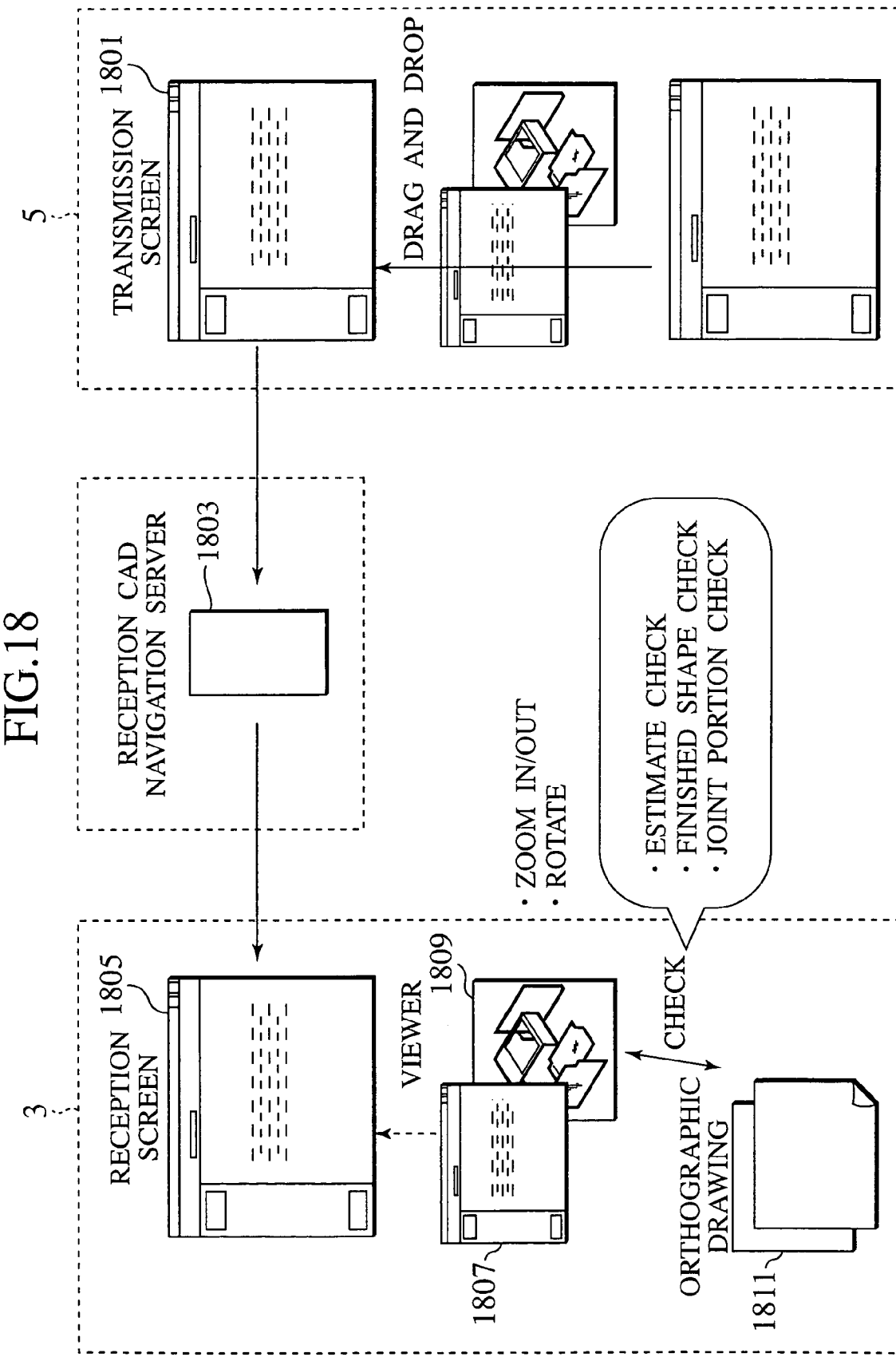
FIG. 18 is an explanatory view illustrating communication of estimate contents.

In step S219, the estimate and the like are provided to the purchaser 3. FIG. 18 shows an example of providing the estimate and the like to the purchaser 3. The supplier 5 selects the purchaser 3 on a transmission screen 1801 and transmits data of the estimate and the like. The data of the estimate and the like is stored in a reception CAD navigation server 1803. The purchaser 3 selects the supplier 5 on a reception screen 1805 and receives the data of the estimate and the like stored in the reception CAD navigation server 1803. The purchaser 3 checks contents of the estimate, a finished shape, joint portions, and the like with reference to an estimate screen 1807, a solid view screen 1809 of the product divided into components, an orthographic drawing 1811, and the like.

FIGS. 19 and 20 show a screen of the estimate for each component. The purchaser 3 can see as many the estimate screens as the components contained in the product.

The estimate screen includes the following items: an estimate number item 1901; a customer item 1903; an order number item 1905; an order class item 1907; a product name item 1911; a product number item 1913; a drawing number item 1915; a parent information item 1917; an in-house delivery date item 1919; a specified BOX item 1921; an item 1923 of the number of ordered products; an item 1925 of the number of stocks; an item 1927 of the number of manufactured products; a new/repeat item 1929; a processing note 1 item 1931; a processing note 2 item 1933; a change history 1 item 1935; a change history 2 item 1937; a product information 1 item 1939; a product information 2 item 1941; a delivery slip note item 1943; a delivery note item 1945; a process name item 2001; a processing due date item 2003; a worker item 2005; a process detail item 2007; a related image data screen 2009; a material memo item 2011; a sheet thickness/raw material dimension item 2013; a component dimension item 2015; an item 2017 of the number of taken pieces; a constituent number item 2019; a bending information 1 item 2021; a bending information 2 item 2023; and a memo field 2025.

The delivery date (not-shown) of the product calculated from due dates of these components and a product cost (not-shown) are displayed on a screen.

<Negotiation and Review>

Figure 21:
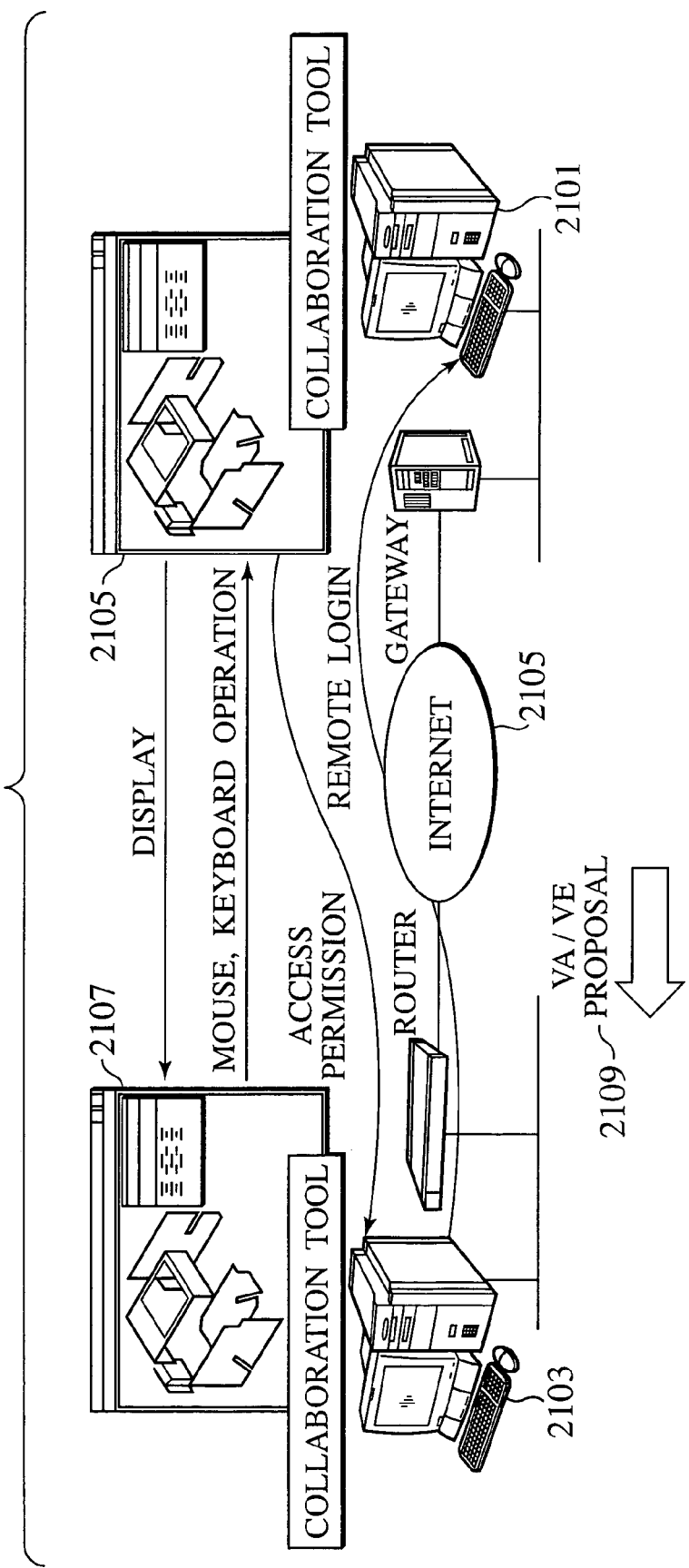
FIG. 21 is an explanatory view illustrating negotiation between a purchaser and a supplier.

In step S221, the purchaser 3 and the supplier 5 negotiate with each other. FIG. 21 shows a method of the negotiation. For example, the solid view designed by the supplier 5 is shared by using collaboration tools between the purchaser 3 and the supplier 5, and VA/VE proposal and examination of design contents are performed. Specifically, a computer 2101 provided for the supplier 5 and a computer 2103 provided for the purchaser 3 are connected by an electric communication line such as the Internet. The solid view is simultaneously displayed on a screen 2105 of the supplier 5 and a screen 2107 of the purchaser 3. The supplier 5 then performs the VA/VE proposal and the like to the purchaser. As a result, if the purchase 3 agrees to the estimate and the like, a processing is finished.

Otherwise, the processing proceeds to step S223. In step S223, review of the VE/VA is decided, and the processing is returned to step S207.

Figure 22:
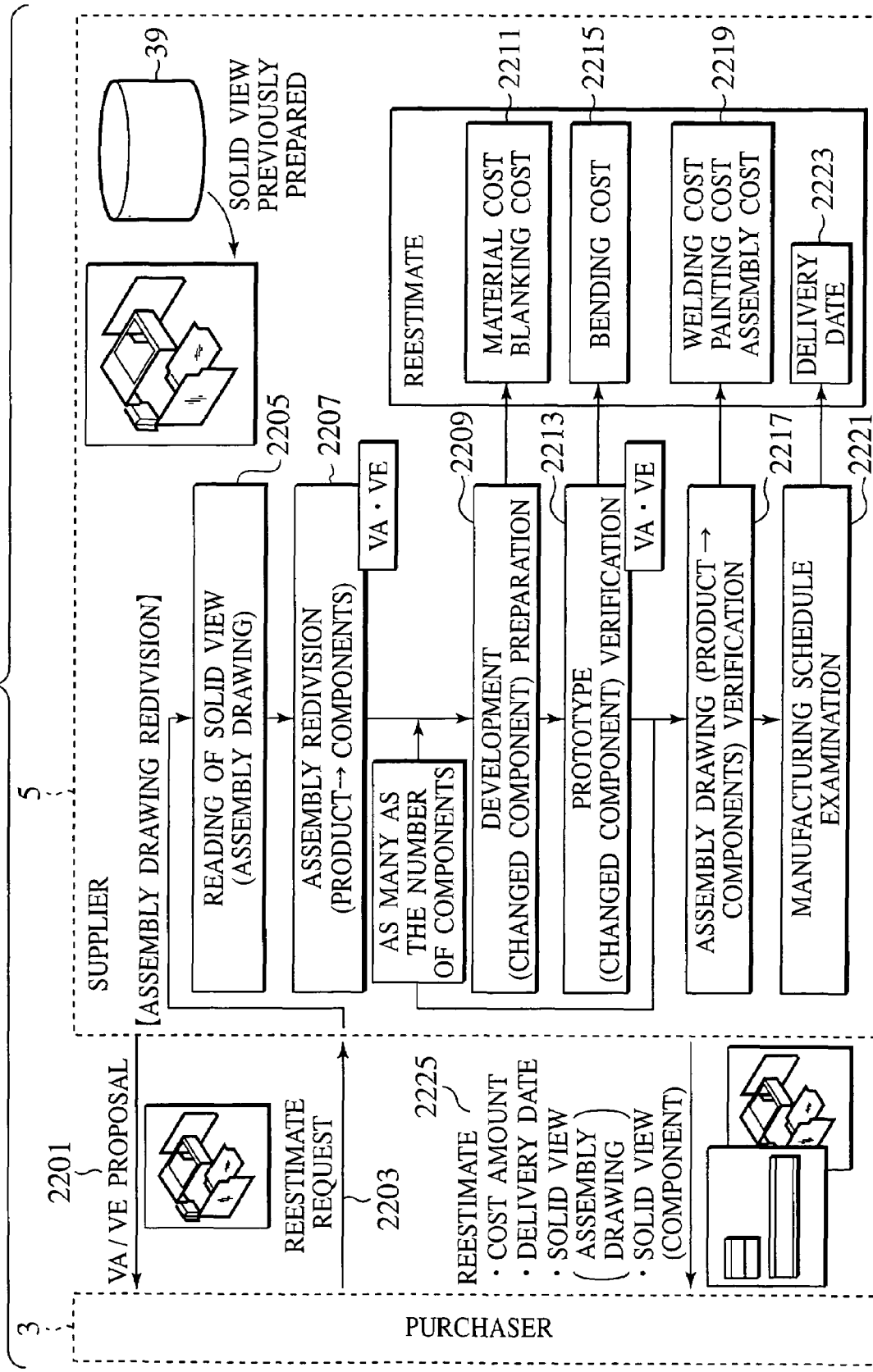
FIG. 22 is an explanatory view illustrating review of a design.

FIG. 22 shows a method of reviewing the VA/VE. After the supplier 5 performs VE/VA proposal 2201 to the purchaser, for example, the purchaser asks the supplier 5 for are-estimate request 2203. For re-estimate, the supplier 5 performs reading 2205 of the solid view from the product related data file 39. Division 2207 is performed on this solid view so as to become a plurality of components (2207). Preparation 2209 of developments of changed components is then performed. At this time, material and blanking costs are calculated. Subsequently, prototype verification 2213 of the changed components is performed. At this time, a bending cost is calculated. Assembly drawing verification (from components to product) 2217 is then performed, and welding, painting, and assembly costs 2219 are calculated. Manufacturing schedule examination 2221 is performed, and a delivery date 2223 is determined. Thus, the re-estimation can be performed for the purchaser 3.

With this re-estimation method, for example, changes in the product and the like can be dealt with. Specifically, since the solid view as CAD data is modified, the solid shape and the developments are modified by only modifying dimensions. Accordingly, calculation of the delivery date and the estimate can be automatically performed.

<Product Processing>

When the purchaser 3 agrees to the estimate and the like, processing proceeds to actual product processing. When the product processing is started, designing of the product and the like have been already finished. Accordingly, the product is manufactured for a shorter period than that of an existing method in which the product is designed after estimating.

Figure 23:
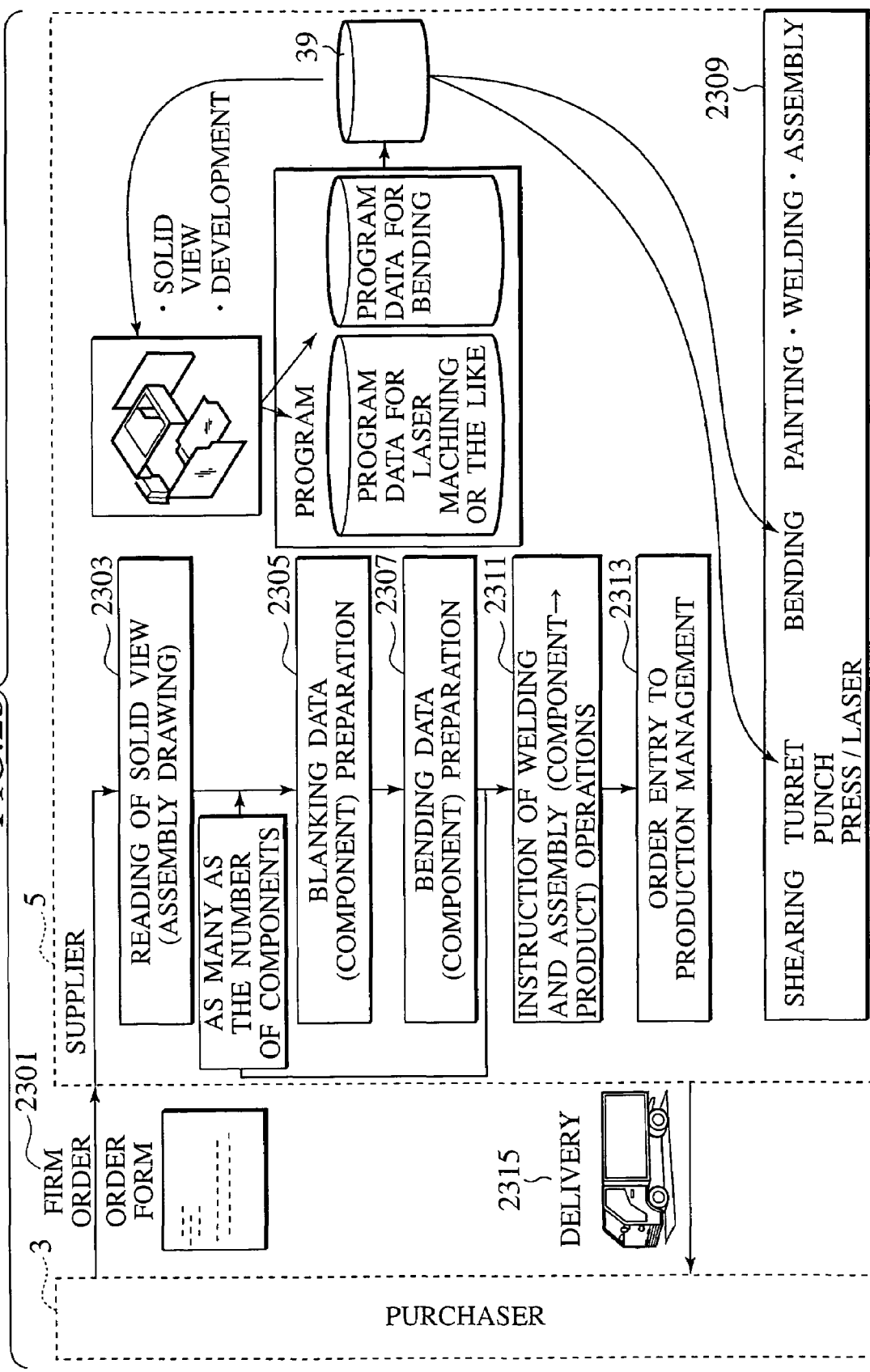
FIG. 23 is an explanatory view illustrating processing of a product.

FIG. 23 shows a method of processing the product. The purchaser 3 issues a firm order (order form) 2301 to the supplier 5. The supplier 5 performs reading 2303 of the solid view (assembly drawing) from the product drawing related data file 39. Preparation 2305 of (component) data for turret punch press and for laser machining is automatically performed based on the development data of the components, and the data for turret punch press machining and for laser machining is stored in the product drawing related file 39. Preparation 2307 of (component) data for bending is performed, and the data for bending is stored in the product drawing related file 39. Subsequently, the components are processed by each processing machine 2309.

Welding, assembling, painting, and the like 2311 are performed for the machined components. When the product is completed, order entry 2313 to production management is performed, and delivery 2315 of the product to the purchaser 3 is performed.

The present invention is not limited to the above described embodiment and can be embodied in other forms by adding proper modifications.

INDUSTRIAL APPLICABILITY

As described above, according to the present invention, an estimate is prepared while design of a product is performed. Therefore, since the design of the product, preparation of NC data, and the like have already finished when an order is formally received, there is an advantage that a period of time for manufacturing the product is shortened.

Unlike a usual estimating operation where a solid view of the product is imagined in a mind with reference to a paper orthographic drawing, the solid view can be examined on a CAD screen. Accordingly, there is an advantage that accurate calculation of an estimate and a delivery date can be performed.

If a design change and the like occurs, there is an advantage that an estimate and a delivery date can be calculated by only modifying dimensions.

What is claimed is:

1. A method of preparing an estimate for sheet metal working, comprising:

storing data of bending lines and data of an associated processing time for the bending lines;

storing data of holes and data of an associated processing time for the holes;

preparing a three-dimensional view and a development drawing which realizes the three-dimensional view based on an orthographic drawing;

detecting a bending line and a hole on a product based on at least one of data of the three-dimensional view and data of the development drawing;

calculating a processing time of the detected bending line based on the associated data of the bending lines;

calculating a processing time of the detected hole on the product based on the associated data of the holes;

storing the processing time of the bending line and the processing time of the hole in a processing time memory;

calculating a total processing time necessary to process the product by adding the processing times stored in the processing time memory; and converting the total processing time to a cost of processing the product in consideration of a cost per processing time.

2. The method of claim 1, further comprising:

specifying at least one of types and numbers of processing machines necessary to process the product;

calculating, for each of the processing machines, a period of time when each of the processing machines operates to process the product;

generating a future processing schedule for each of the processing machines and storing the future processing schedule in a memory;

allocating a work time for manufacturing the product to each of the processing machines in accordance with a result of the generating; and calculating a delivery time necessary to manufacture the product and deliver the product to a customer based on a result of the allocation.

3. The method of claim 2, wherein the future processing schedule includes operating times for a continuous period in the future.

4. A method of preparing an estimate for sheet metal working, comprising:

storing data of bending lines and data of an associated processing time for the bending lines;

storing data of holes and data of an associated processing time for the holes;

preparing a three-dimensional view and a development drawing which realizes the three-dimensional view based on an orthographic drawing;

detecting a bending line and a hole on a product based on at least one of data of the three-dimensional view and data of the development drawing;

calculating a processing time of the detected bending line based on the associated data of the bending lines;

calculating a processing time of the detected hole on the product based on the associated data of the holes;

storing the processing time of the bending line and the processing time of the hole in a processing time memory;

calculating a total processing time necessary to process the product by adding the processing times stored in the processing time memory;

converting the total processing time to a cost of processing the product in consideration of a cost per processing time;

providing at least one of the three-dimensional view and the development drawing together with an estimate to a customer;

modifying the three-dimensional view and the development drawing in accordance with a request of the customer for a change in one of shape and dimensions of the product;

modifying a work time and an associated cost based upon the request of the customer for a change; and providing an estimate including the modified three dimensional view and the modified development drawing and the modified cost to the customer.

5. The method of claim 4, wherein the estimate is provided to the customer through an electronic communication line.

6. A method of manufacturing a product in accordance with an order from a customer, comprising:

preparing an estimate by the method of claim 1;

preparing CAM data based on data of at least one of the three dimensional view and data of the development drawing when the order is accepted; and operating a sheet-metal working machine, based on the CAM data, to manufacture the product.

7. A method of manufacturing a product in accordance with an order from a customer, comprising:

preparing an estimate by the method of claim 4;

preparing CAM data based on data of at least one of the three dimensional view and data of the development drawing when the order is accepted; and operating a sheet-metal working machine, based on the CAM data, to manufacture the product.

8. The method of claim 1, wherein the three dimensional view and the development are prepared using a computer, and wherein the processing time of the detected bending line is calculated using a computer.

9. The method of claim 4, wherein the three dimensional view and the development are prepared using a computer, and wherein the processing time of the detected bending line is calculated using a computer.

10. The method of claim 1, wherein the data of bending lines and data of processing time for the bending lines are stored in association with each other, and wherein the data of holes and data of processing time for the holes is stored in association with each other.

11. The method of claim 4, wherein the data of bending lines and data of processing time for the bending lines are stored in association with each other, and wherein the data of holes and data of processing time for the holes is stored in association with each other.

* * * * *